(12) United States Patent
Hirabayashi et al.

(10) Patent No.: US 12,140,720 B2
(45) Date of Patent: Nov. 12, 2024

(54) BEAMFORM PROCESSING FOR SONIC IMAGING USING MONOPOLE AND DIPOLE SOURCES

(71) Applicant: Schlumberger Technology Corporation, Sugar Land, TX (US)

(72) Inventors: Nobuyasu Hirabayashi, Sugar Land, TX (US); Yevgeniy Karpekin, Sugar Land, TX (US); Nicholas Norman Bennett, Hamden, CT (US); John Adam Donald, Dubai (AE); Asbjoern Lund Johansen, Houston, TX (US); Takeshi Endo, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 291 days.

(21) Appl. No.: 17/995,170

(22) PCT Filed: Mar. 30, 2021

(86) PCT No.: PCT/US2021/024959
§ 371 (c)(1),
(2) Date: Sep. 30, 2022

(87) PCT Pub. No.: WO2021/202582
PCT Pub. Date: Oct. 7, 2021

(65) Prior Publication Data
US 2023/0221453 A1    Jul. 13, 2023

Related U.S. Application Data

(60) Provisional application No. 63/002,976, filed on Mar. 31, 2020.

(51) Int. Cl.
*G01V 1/36* (2006.01)
*G01V 1/46* (2006.01)
*G01V 1/50* (2006.01)

(52) U.S. Cl.
CPC .............. *G01V 1/362* (2013.01); *G01V 1/366* (2013.01); *G01V 1/46* (2013.01); *G01V 1/50* (2013.01);
(Continued)

(58) Field of Classification Search
CPC .......... G01V 1/362; G01V 1/366; G01V 1/46; G01V 1/50; G01V 2210/1299; G01V 2210/21
See application file for complete search history.

(56) References Cited

U.S. PATENT DOCUMENTS

| 5,594,706 A | 1/1997 | Shenoy et al. |
| 8,813,869 B2 | 8/2014 | Bennett et al. |

(Continued)

FOREIGN PATENT DOCUMENTS

| GB | 2461363 A | 1/2010 |

OTHER PUBLICATIONS

Hirabayashi et al. "Characteristics of waveforms recorded by azimuthally spaced hydrophones of sonic logging tool for incident plane waves", Geophysics., vol. 82, No. 6, 2017 (Year: 2017).*

(Continued)

*Primary Examiner* — Luke D Ratcliffe
*Assistant Examiner* — Christopher Richard Walker
(74) *Attorney, Agent, or Firm* — Jeffrey D. Frantz

(57) ABSTRACT

Embodiments provide for a method that utilizes the azimuthally spaced receivers of a sonic logging tool. Signals from monopole and dipole sources are reflected from the geologic interfaces and recorded by arrays of receivers of the same tool. For the incident P-waves from the monopole source, phase arrival times for the azimuthal receivers are compensated for stacking using properties of wave propagation in the borehole, and for the incident SH-waves from (Continued)

the dipole source, signs of waveforms for the receivers are changed for specified azimuths.

13 Claims, 23 Drawing Sheets

(52) U.S. Cl.
CPC .. *G01V 2210/1299* (2013.01); *G01V 2210/21* (2013.01); *G01V 2210/51* (2013.01)

(56) References Cited

U.S. PATENT DOCUMENTS

| | | | |
|---|---|---|---|
| 10,613,242 B2 | 4/2020 | Hirabayashi | |
| 10,768,329 B2 | 9/2020 | Hirabayashi et al. | |
| 2004/0158997 A1* | 8/2004 | Tang | E21B 47/026 33/304 |
| 2016/0291189 A1 | 10/2016 | Collins | |
| 2017/0184752 A1* | 6/2017 | Walker | G01V 1/50 |

OTHER PUBLICATIONS

Extended Search Report issued in European Patent Application No. 21780302.2 dated Mar. 6, 2024, 10 pages.
Esmersoy et al., 1998, Acoustic imaging of reservoir structures from a horizontal well: The Leading Edge, 17, 940-946.
Krim H. et al., 1996, Two decades of array signal processing research: the parametric approach: IEEE Signal Processing Magazine, 13, 67-94.
Hirabayashi et al., 2016, Reflector imaging using trial reflector and crosscorrelation: Application to fracture imaging for sonic data: Geophysics, 81, S433-S446.
Hirabayashi et al., 2017, Characteristics of waveforms recorded by azimuthally spaced hydrophones of sonic Jogging tool for incident plane waves: Geophysics, 82, D353-D368.
Haldorsen et al., 2010, Borehole acoustic reflection survey (BARS) using full waveform sonic data: First Break, 28, 33-38.
Hornby, B. E., 1989, Imaging of near-borehole structure using full-waveform sonic data: Geophysics, 54, 747-757.
Bennett N.N., 2019, 3D slowness time coherence for sonic imaging: Geophysics, 84, D179-407 D189.
Haldorsen et al., 2006, Borehole acoustic reflection survey for high resolution imaging, in SEG Technical Program Expanded Abstracts 2006: Society of Exploration Geophysicists, 314-318.
Hirabayashi et al., 2019, Wavefield separation for borehole acoustic reflection survey using parametric decomposition and waveform inversion: Geophysics, 84, D151-D159.
Hoyes J. et al., 2011, A review of "global" interpretation methods for automated 3rd horizon picking: The Leading Edge, 30, 38-47.
Jervis et al., 2018, High-resolution acoustic imaging from a borehole to detect a nearby well: The Leading Edge, 37, 812-817.
Johansen A.L. et al., 2019, Advances in active acoustic ranging: The Leading Edge, 38, 843-849.
Kumar, R.N. et al., 2019, 3D borehole sonic imaging for input to structural modeling a quantitative approach: Presented at the SPE Middle East Oil and Gas show and conference, society of petroleum engineers (13 pages).
Poedjono, B. et al., 2017, Active Acoustic ranging to locate two nearby wellbores in deepwater gulf of mexico: Presented at the SPE Annual Technical Conference and Exhibition, Society of Petroleum Engineers (16 pages).
Tang, X.M., 1997, Predictive processing of array acoustic waveform data: Geophysics, 62, 1710-1714.
Tang, X.M., et al., 2009, Single-well s-wave imaging using multicomponent dipole acoustic-log data: Geophysics, 74, WCA211-WCA223.
International Search Report and Written Opinion issued in PCT Application PCT/US2021/024959, dated Jul. 8, 2021 (9 pages).
Hao et al., 2018, Modeling and inversions of acoustic reflection logging imaging using the combined monopole-dipole measurement mode. Applied Geophysics, Dec. 31, 2018, vol. 15, No. 3-4, pp. 393-400.
Haldorsen et al., 1994, Multichannel Wiener deconvolution of vertical seismic profiles, Geophysics, vol. 59, No. 10, Oct. 1994, pp. 1500-1511.
International Preliminary Report on Patentability issued in the PCT Application No. PCT/US2021/024959 dated Oct. 13, 2022, 6 pages.

\* cited by examiner

BEAMFORM PROCESSING FOR SONIC IMAGING USING MONOPOLE AND DIPOLE SOURCES

CROSS-REFERENCE TO RELATED APPLICATIONS

The present application is a national stage application under 35 U.S.C. § 371 of International Application No. PCT/US2021/024959, filed Mar. 30, 2021, which claims priority to U.S. Provisional Patent Application 63/002,976, filed Mar. 31, 2020, the entirety of which are incorporated by reference.

FIELD OF THE INVENTION

The present application relates to acoustic surveys. More specifically, aspects of the disclosure relate to methods of processing sonic surveys.

BACKGROUND

Sonic imaging, which is also known as the borehole acoustic reflection surveys (BARS), uses a sonic logging tool in a fluid-filled borehole to image geologic structures. Signals from monopole and dipole sources are reflected from the geologic interfaces and recorded by arrays of receivers of the same tool. Because the amplitudes of the event signals are very weak, the event signals are often difficult to extract. To enhance the weak event signals, beamforming techniques have been developed, which stack the waveforms of azimuthally spaced receivers of the tool for given azimuthal directions. For the incident P-waves from the monopole source, phase arrival times for the azimuthal receivers are compensated for stacking using properties of wave propagation in the borehole, and for the incident SH-waves from the dipole source, signs of waveforms for the receivers are changed for specified azimuths. When the waveforms are stacked for the back-azimuth of the event signals, signal-to-noise ratio of the event signals is significantly improved because the event signals are enhanced whereas direct waves are relatively smeared, and random noise is canceled, therefore, such analysis also provide accurate back-azimuths of the incident waves.

SUMMARY

So that the manner in which the above recited features of the present disclosure can be understood in detail, a more particular description of the disclosure, briefly summarized below, may be had by reference to embodiments, some of which are illustrated in the drawings. It is to be noted that the drawings illustrate only typical embodiments of this disclosure and are therefore not to be considered limiting of its scope, for the disclosure may admit to other equally effective embodiments without specific recitation. Accordingly, the following summary provides just a few aspects of the description and should not be used to limit the described embodiments to a single concept.

A method for processing of a sonic monopole waveform is described. The method may comprise obtaining a beamform stack of the sonic monopole waveform to produce a first result. The method may also comprise performing a band-pass filtering on the first result to produce a second result. The method may also comprise performing an adaptive interference canceler filtering on the second result to produce a third result. The method may also comprise performing a median filtering on one of the third result to produce a fourth result. The method may also comprise performing a coherency filtering on the fourth result to produce a final processing of the sonic monopole waveform.

In another example embodiment, a method for processing of a sonic dipole waveform is disclosed. The method may comprise obtaining a beamform stack of the sonic dipole waveform to produce a first dipole result. The method may further comprise performing a band-pass filtering on the first dipole result to produce a second dipole result. The method may also comprise performing a median filtering on one of the second dipole result to produce a third dipole result. The method may also comprise performing a deconvolution on the third result to produce a fourth dipole result. The method may also comprise performing a coherency filtering on the fourth result to produce a final processing of the sonic dipole waveform.

BRIEF DESCRIPTION OF THE DRAWINGS

Various aspects of this disclosure may be better understood upon reading the following detailed description and upon reference to the drawings in which.

DETAILED DESCRIPTION

Figure 1:
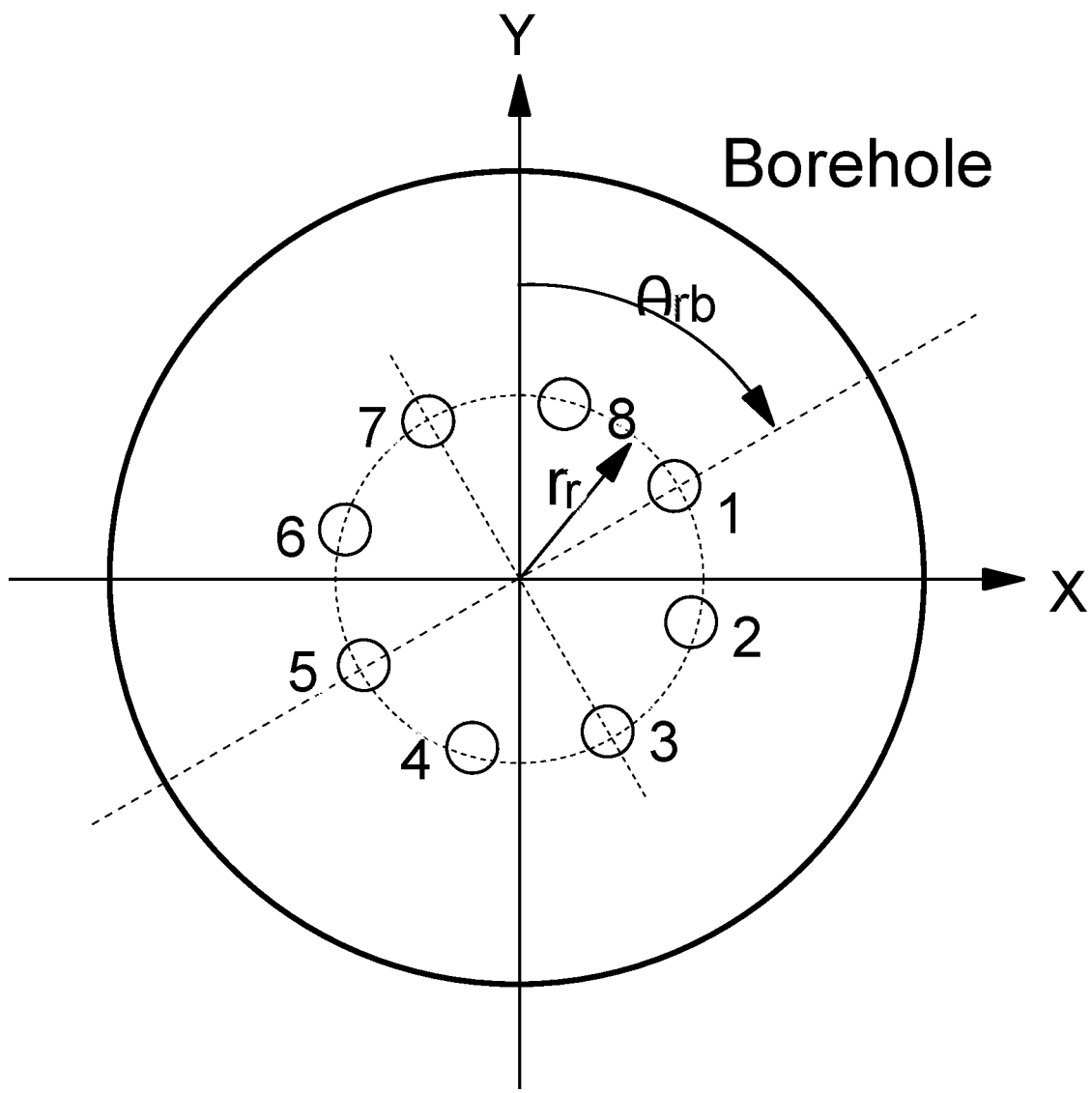
FIG. 1 is a depiction of a sonic tool in a borehole wherein the x- and y-axes are taken in the perpendicular direction to the well, the z-axis is taken in the direction of the well and the azimuth is measured clockwise from the y-axis and further wherein the numbered circles show the receivers, Or is the relative bearing, which is the azimuth of the first receiver, and $r_r$ is the radial distance of the receiver positions.

Geologic structures away from a borehole are imaged using waveforms acquired by a sonic logging tool, and this imaging procedure is called sonic imaging, which is also known as a borehole acoustic reflection survey (BARS). Signals from a monopole or dipole source of the sonic logging tool are reflected from geologic interfaces, which are formation boundaries and fractures, and recorded by receivers of azimuthally spaced arrays of the same tool (for example, Hornby, 1989; Esmersoy et al., 1998; Tang and Patterson, 2009; Haldorsen et al., 2010). Sonic imaging is also used for ranging surveys, in which a well is searched for from another well (Poedjono et al., 2017; Jervis et al., 2018; Johansen et al., 2019).

The greatest difficulty of sonic imaging is to extract weak event signals from the sonic waveforms, in which the direct P-, S-, and mode waves (e.g., Stoneley and flexural waves) have significantly larger amplitudes than the event signals. Various filters have been developed and tried to separate waveforms (for example, Hornby, 1989; Tang, 1997; Haldorsen et al., 2006; Hirabayashi and Leaney, 2019). Aspects described herein concentrate on methods to enhance the weak event signals using the waveforms acquired by a multi-azimuth sonic logging tool. These methods improve resolution of detailed structures in migration images, and potentially reduce processing dependencies on the filters.

To enhance the weak event signals, stacking methods of the waveforms of the azimuthally spaced receivers are considered. Stacking methods are developed for the incident P- and SH-waves, whose central frequencies are 8 and 4 kHz, respectively. These stacking methods are named the beamform stacks because the stacked waveforms have directivity in the azimuth of the well. The beamform method, which uses steering vectors, is well known (for example, Krim and Viberg, 1996), and also uses the steering vector of slowness in the methods described herein.

For the incident P-waves, the phase arrival time differences of the incident waves for the azimuthally spaced receivers are not negligible compared to the dominant period for stacking. Therefore, the arrival times are compensated to stack the event signals. Usually, the formation P-velocity for sonic imaging is much faster than the fluid velocity. Therefore, the incident waves are expected to be sharply bent at the formation-fluid interface. This mechanism will reduce dependency on the incident angles of the phase arrival time differences for the azimuthally spaced receivers. Based on this assumption, an apparent slowness is found for the azimuthally spaced receivers to compensate the arrival times of phases. The stacked waveforms oriented to the back-azimuth have high signal-to-noise ratio because the event signals are enhanced, direct waves are relatively smeared, and random noise is canceled. Because they also have apparent signal amplitudes differences in azimuths, the back-azimuths of events are accurately obtained. Determination of the dips and azimuths of the reflectors is an important role of sonic imaging. 3D Slowness Time Coherency (3DSTC) method estimates the dips and azimuths by analyzing the event signals recorded by the receivers, which are axially and azimuthally spaced in the sonic tool. Aspects provide for methods, which do not require time-picking, to obtain the dips and azimuths utilizing directive migration images obtained by using the beamform stack.

For the incident SH-waves, the phase arrival time differences of the incident waves for the azimuthally spaced receivers are negligible for stacking. Hirabayashi et al. (2017) proposed a stacking method to identify the back-azimuth of the incident waves. Embodiments improve upon this method to construct the waveforms oriented to arbitrary azimuthal directions and to resolve 180° ambiguities of the back-azimuth.

The trial reflector migration method of Hirabayashi (2016) is used for migrating the beamform stacked waveforms. The acquired waveforms are fully beamformed to the reflectors by using the trial reflector migration because the beamform stack beamforms the waveforms in the azimuthal direction, and the trial reflector migration beamforms the images in the direction of the measurement positions.

In embodiments, the beamform stacking methods are developed after the wave propagation of the incident waves in the borehole is investigated. Then, the beamform stacking methods are examined and validated using field examples of sonic imaging waveforms for the monopole and dipole sources. The field data were acquired in a 60° deviated well in a fast formation.

Method

Embodiments provide for a goal to develop stacking methods to enhance event signals for sonic imaging. In one example embodiment, the incident P-waves whose central frequency is 8 kHz, it is shown that the phase arrival differences for the azimuthally spaced receivers in the borehole can be approximated by using an appropriate apparent slowness regardless of the incident angles. For the incident SH-waves whose central frequency is 4 kHz, the method shows that the phase arrival difference is negligible. To investigate the wave propagation in the borehole, synthetic waveforms generated by the method of Hirabayashi et al. are used. After, the wave propagation in the borehole are used and stacking methods of the waveforms for the P- and S-waves are developed.

Sonic Logging Tool

The sonic logging tool considered in this section has Na receiver arrays, which are azimuthally spaced, and each receiver array has Nr receivers. The receiver arrays are azimuthally spaced at 40 intervals at the same radial positions, rr, from the center of the tool. FIG. 1 shows the cross section of the tool in the borehole, where the number of receiver arrays is eight. The x- and y-axes are taken in the directions perpendicular to the well, and the z-axis is taken in the direction of the well. The numbered circles show the receivers of the receiver arrays, the relative bearing of the tool, Orb, is the azimuth of the first receiver array measured clockwise from the y-axis. For the synthetic generation, both Orb and the azimuth of the incident wave, θ, are set to zero.

Apparent Phase Slowness in Borehole

Figure 2:
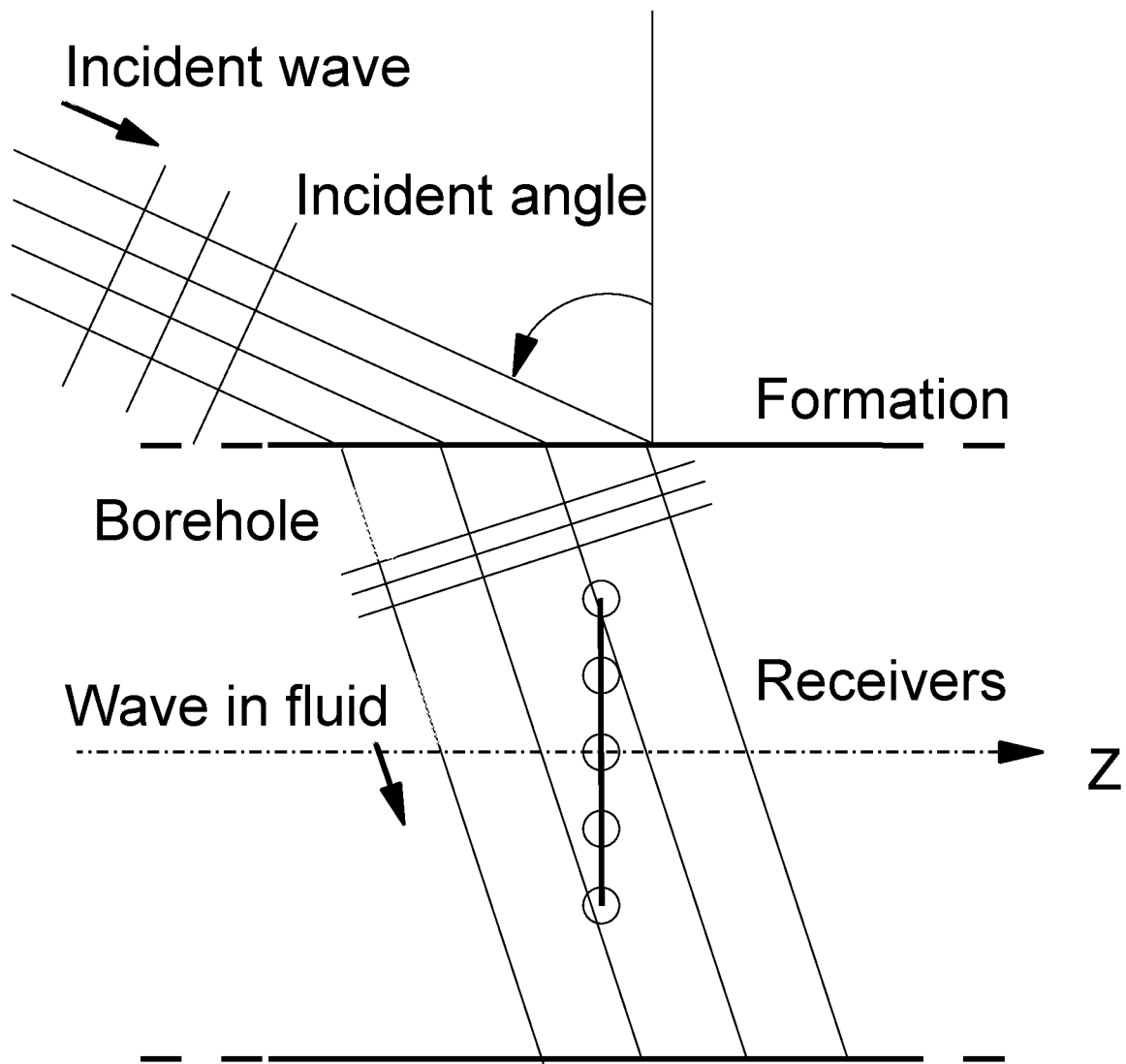
FIG. 2 is a schematic illustration of waves in and out of the borehole for the incident P-wave where the incident angle is measured from the y-axis in the y-z plane and the white circles show azimuthally spaced receivers.

Apparent phase slowness for the azimuthally spaced receivers at the same depth position is estimated using the synthetic waveforms generated by the method of Hirabayashi et al. (2017). FIG. 2 shows the schematic illustration of waves in and out of the borehole for the incident P-wave. Due to a high velocity contrast between the formation and fluid velocities, the incident waves are sharply bent. The synthetic waveform trace is denoted by $u(\varphi,\theta,t)$ where $\varphi$ is the incident angle, $\theta$ is the azimuth of receiver, and t is the recording time. Cross correlation is used to measure the phase arrival differences of the event signals for the azimuthal receivers. The time difference of the event signals between the waveforms observed by the receivers at θ1 and θ2 azimuths is denoted by $t(\varphi,\theta 1,\theta 2)$ and obtained by selecting t, which maximizes cross correlation;

$$c(\phi, \theta_1, \theta_2, t) = \frac{\left|\int_0^T u(\phi, \theta_1, \tau)u(\phi, \theta_2, t+\tau)d\tau\right|}{\left[\int_0^T u^2(\phi, \theta_1, \tau)d\tau \int_0^T u^2(\phi, \theta_2, t+\tau)d\tau\right]^{1/2}}, \quad (1)$$

where T is the total time of the synthetic waveforms. The apparent phase slowness, $s_a(\varphi)$, is computed by $$s_a(\phi) = \frac{t\left(\phi, 0, \frac{\pi}{2}\right)}{r_r}. \quad (2)$$

Monopole Beamform Stack

The waveform trace is denoted by uij (t), where i and j are indices of the azimuthal array and the receiver in the array, respectively. The beamformed trace, which is oriented to the azimuth, θ, is constructed by $$u_j^-(\theta; t) = \sum_{k=1}^{N_a} X_{u_{k_j}}(t - s(\theta) \cdot x_k), \quad (3)$$

where $x_k$ is the receiver position given by $$x_k = r_r(\cos\theta_k \sin\theta_k, 0), \quad (4)$$

where $\theta_k$ is the azimuth of the receiver position given by $$\theta_k = \frac{1}{2}\pi - (k-1)\Delta\theta - \theta_{rb}, \quad (5)$$

and s(θ) is the 2D slowness vector given by $$s(\theta) = -s_a(\phi')\left(\cos\left(\frac{1}{2}\pi - \theta\right), \sin\left(\frac{1}{2}\pi - \theta\right), 0\right), \quad (6)$$

where we use $$\phi' = \frac{1}{2}\pi$$

for the waveform processing.

Dipole Beamform Stack

Azimuthally spaced receivers at a single depth position are considered, where the number of receivers is denoted by NA, and NA is assumed to be even, where the azimuth is measured clockwise from the north. The waveforms recorded by individual receivers are denoted by u(iΔθ,t), where i is the azimuthal receiver index (0≤ i<NA), Δθ is the azimuthal step of receiver positions (Δθ=2π/NA), and t is the recording time. The azimuth, iΔθ, is relative to the tool, and u(iΔθ,t) is supposed to satisfy $$u(i\Delta\theta,t)=(i\Delta\theta+2\eta\pi,t), \quad (7)$$

where n is any integer. The stacked waveforms oriented to (i+1/2)Δθ azimuth are given by $$\hat{u}\big((i+1/2)\Delta\theta, t\big) = \sum_{k=0}^{N_A/2-1-p} [u((i+k+p+1)\Delta\theta, t) - u((i-k-p)\Delta\theta, t)], \quad (8)$$

[where p is an integer satisfying 0≤p<NA/2. p=1 or 2 is used to resolve a 180° ambiguity of back-azimuth of the event signal. The amplitudes of the receivers that are opposite to the back-azimuth are stronger. Because the first stacked waveform trace is defined at ½Δθ, it is convenient to redefine the waveform trace and relative bearing as $$\hat{u}'(i\Delta\theta,t)=\hat{u}((i+1/2)\Delta\theta,t), \quad (9)$$

and $$\theta'_{rb} = \theta_{rb} + \frac{1}{2}\Delta\theta, \quad (10)$$

where $\theta_{rb}$ and $\theta_{rb}^0$ are the relative bearing of the tool to the absolute azimuth and its modification, respectively. Suppose θ is the absolute azimuth, the relative azimuth of θ for the stacked waveforms is given by $$\theta'=\theta-\theta'_{rb}, \quad (11)$$

The closest index of stacked waveform trace is given by $$i' = \left\lfloor \frac{\theta'}{\Delta\theta} \right\rfloor, \quad (12)$$

where ⌊•⌋ indicates the round function, and i' is an integer. The azimuth difference between θ' and i'Δθ is given by $$\delta\theta=\theta'-i'\Delta\theta, \quad (13)$$

where δθ satisfies |δθ|≤Δθ/2. Then, the waveform trace oriented to 0 is obtained using the Taylor expansions for δθ≠0 as $$\hat{u}''(\theta,t)=c_1\hat{u}'((i'-1)\Delta\theta,t)+c_2\hat{u}'(i'\Delta\theta,t)+c_3\hat{u}'((i'+1)\Delta\theta,t), \quad (14)$$

Where $\hat{u}''(\theta,t)$ is the waveform trace oriented to absolute azimuth θ, and $c_1$, $c_2$, and $c_3$ are coefficients for stacked waveforms given by $$c_1 = \frac{Q\delta\theta^2}{2R}, \quad (15)$$

$$c_2 = \frac{P(\Delta\theta - \delta\theta)^2 - Q(\Delta\theta + \delta\theta)^2}{2R}, \quad (16)$$

$$c_3 = -\frac{P\delta\theta^2}{2R}, \quad (17)$$

where P, Q, and R are given by $$P = \frac{1}{2}\delta\theta\Delta\theta(\Delta\theta - \delta\theta), \quad (18)$$

$$Q = \frac{1}{2}\delta\theta\Delta\theta(\Delta\theta - \delta\theta), \quad (19)$$

$$R = -\frac{1}{2}P\Delta\theta(\Delta\theta - 2\delta\theta) - \frac{1}{2}Q\Delta\theta(\Delta\theta + 2\delta\theta). \quad (20)$$

$$\hat{u}'''(\theta,t)=\sigma\hat{u}''(\theta,t), \quad (21)$$

The polarity of the waveforms is modified for the x- and y-dipole sources as where $\hat{u}'''(\theta,t)$ is the beamformed waveforms, and σ is a sign changed depending on the b dipole source and $\theta''=\theta-\theta_{rb}$, respectively. For the x-dipole, $$\sigma = \begin{cases} 1, & \left(0 \le \theta'' < \frac{\pi}{2}, \frac{3}{2}\pi \le \theta'' < 2\pi\right) \\ -1, & \left(\frac{\pi}{2} \le \theta'' < \frac{3\pi}{2}\right) \end{cases}, \quad (22)$$

for the y-dipole, $$\sigma = \begin{cases} 1, & (0 \le \theta'' < \pi), \\ -1, & (\pi \le \theta'' < 2\pi). \end{cases} \quad (23)$$

Resolving 180° Azimuth Ambiguity for Dipole

The back-azimuth of the incident SH-wave is obtained by the same method of Hirabayashi et al. (2017), which uses a quadratic interpolation. To resolve a 180° ambiguity of backazimuth, the phase arrival difference of the stacked waveforms of p>0 of equation 8 are compared. Here, the method for migration image is described instead for the waveforms. The depth shift, z, is selected by maximizing cross correlation given by $$c(z) = \frac{\int_{-L}^{L} u_{top}(z+\zeta) u_{bot}(\zeta) d\zeta}{\left[\int_{-L}^{L} u_{top}^2(z+\zeta) d\zeta \int_{-L}^{L} u_{bot}^2(\zeta) d\zeta\right]^{1/2}},\quad (24)$$

where $u_{top}(z)$ and $u_{bot}(z)$ are the image traces, which are oriented to the opposite azimuth, L is an depth interval, where we use $$L = \frac{3v_s}{4f_c},\quad (25)$$

where $v_s$ and $f_c$ are the shear velocity and the central frequency of the source wavelet. The back-azimuth θ is selected as $$\theta = \begin{cases} \theta_{top}, & (z>0), \\ \theta_{bot}, & (z<0), \end{cases} \quad (26)$$

where $\theta_{top}$ and $\theta_{bot}$ are the azimuths for $u_{top}(z)$ and $u_{bot}(z)$, respectively. Usually, resampling of u(z) is required to use equation 24.

Results

As described herein, the wave propagation of the incident waves in the borehole is investigated using synthetic waveforms, which are generated by the method of Hirabayashi et al., and the beamform stacks for the incident P- and SH-waves are validated. Then, the beamform processing based on the analysis results is applied to field data.

Numerical Analysis

The following borehole and tool conditions are used for the synthetic generation. The borehole diameter is 216×10−3 m, the radius of the receiver position is 75×10−3 m, and the fluid velocity and density are 1500 m/s and 1000 kg/m3, respectively. The formation velocities are varied, and Table 1 shows three formation models used. The second derivative of Blackman-Harris wavelets of 8- and 4-kHz central frequencies are used for the source signals of the incident P- and SH-waves, respectively.

Incident P-Waves

Figure 3:
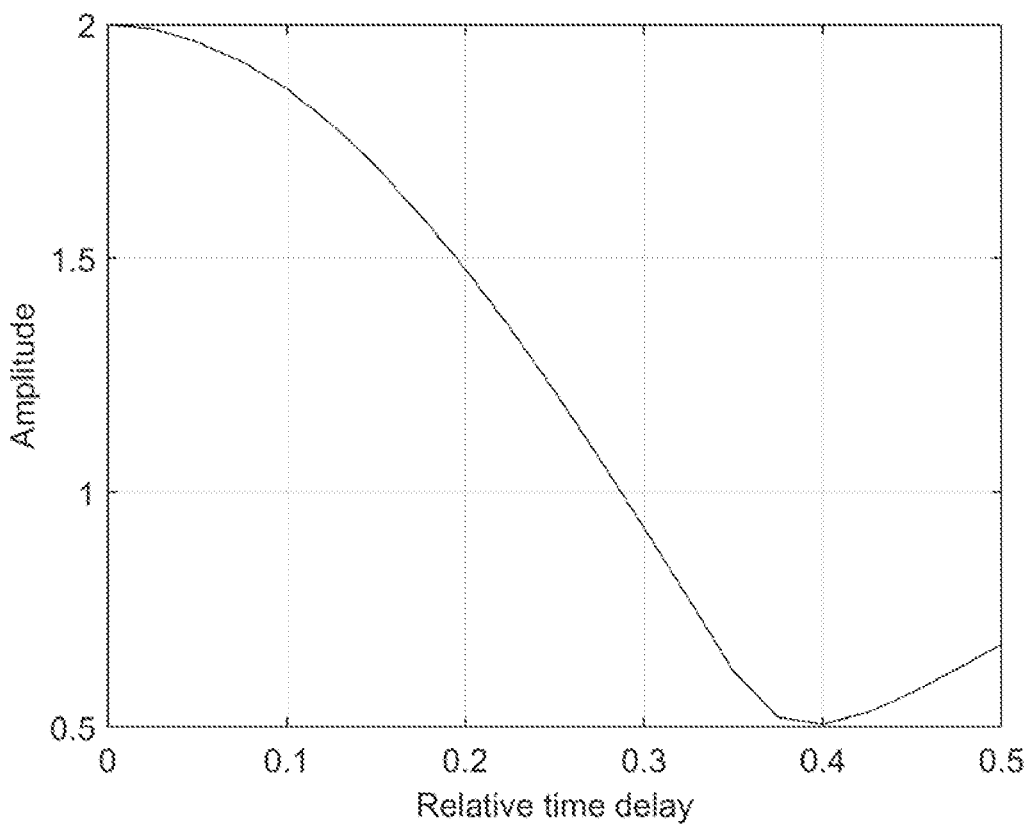
FIG. 3 is an illustration of the maximum amplitude of summed two wavelets versus their time delay wherein the horizontal and vertical axes show the relative time delay and maximum amplitude, respectively, and the maximum amplitude of the wavelet is set to 1, and the time delay is normalized by the dominant period of the wavelet. Amplitude gain is over 86% for the wavelets whose time difference is less than 0.1 relative time difference.

FIG. 3 shows the maximum amplitude of the summed two wavelets versus their time difference. The horizontal and vertical axes show the relative time difference and maximum amplitude, respectively. The maximum amplitude of a single wavelet is set to 1, and the time is normalized by the dominant period of the wavelet. An amplitude gain of 80% is obtained for the wavelets whose time difference is less than 0.125 relative time difference.

Figure 4:
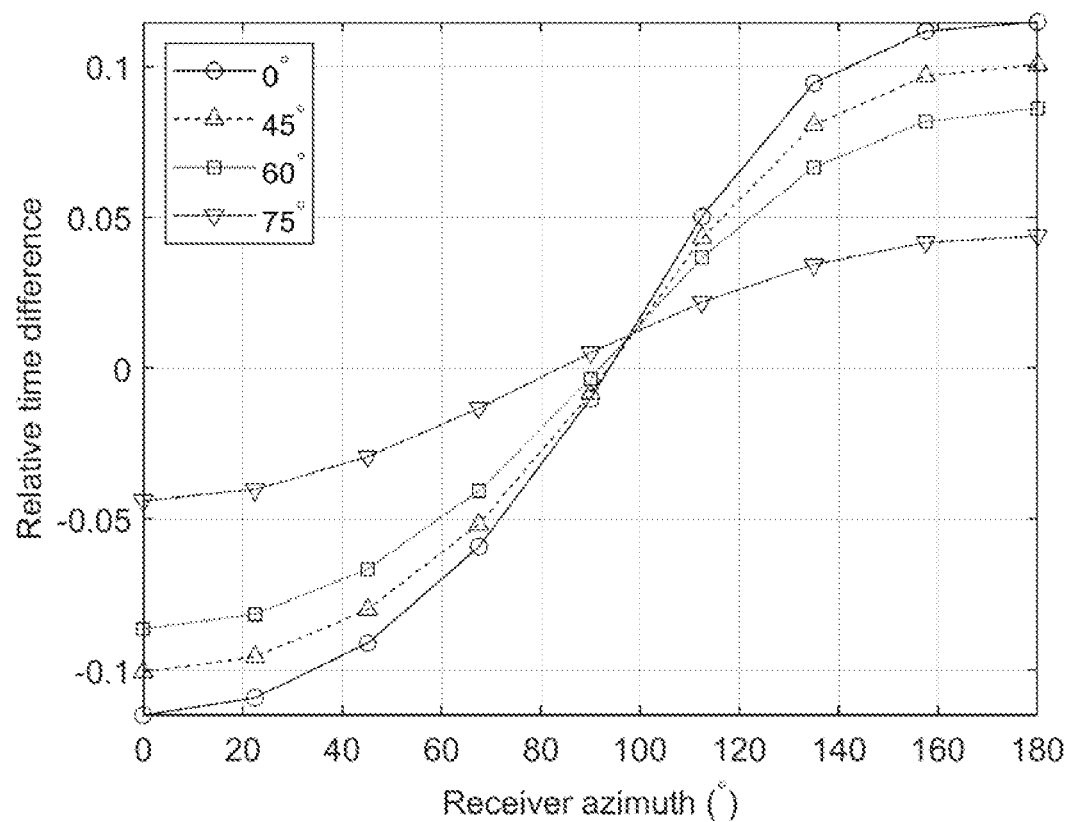
FIG. 4 is an illustration of a phase arrival time difference versus receiver azimuth for model 2 wherein the horizontal and vertical axes show the receiver azimuth and time difference, respectively. The azimuth of the incident wave is 0', and the differences are plotted for the incident angles of 0, 45, 60, and 75, respectively.

FIG. 4 shows the phase arrival time difference versus receiver azimuth for model 2. The horizontal and vertical axes show the receiver azimuth and time difference, respectively. The back-azimuth of the incident wave is set to 0° azimuth. The differences are plotted for 0° to 75° incident angles with respective to the y-axis in the y-z plane. The differences are larger for the smaller incident angles. Generally, the maximum time difference is about 20% of the dominant period of the wavelet.

Figure 5:
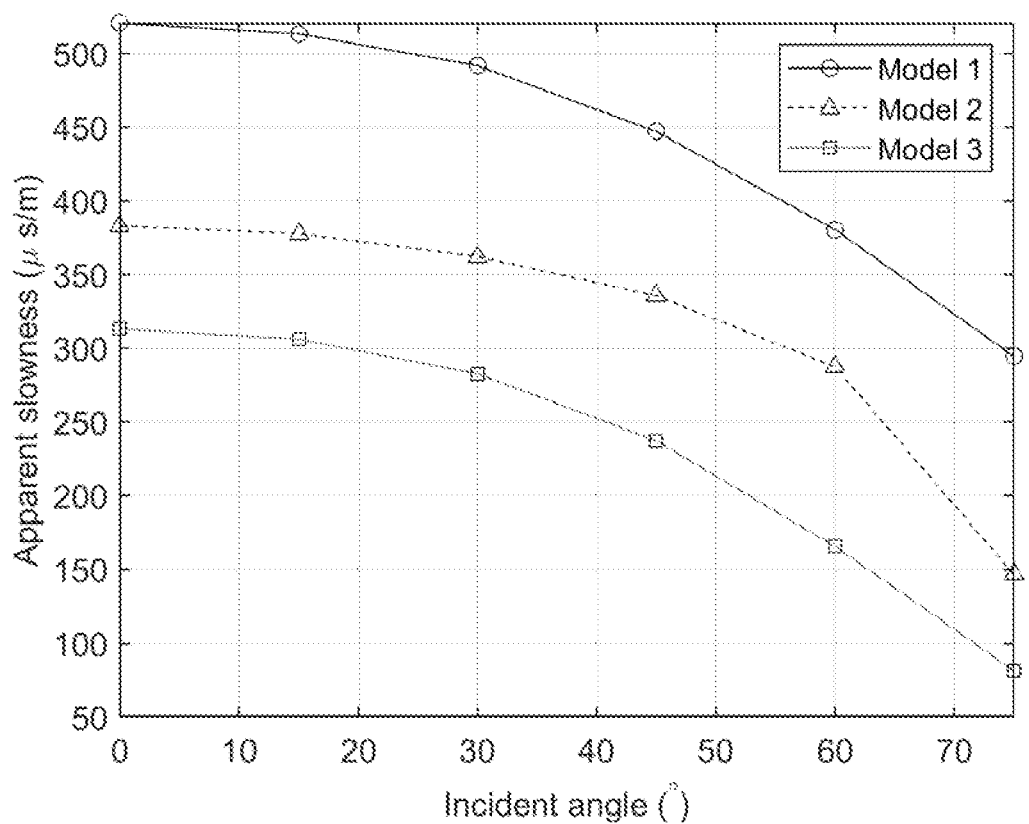
FIG. 5 is an illustration of the apparent phase slowness for azimuthal receivers versus incident angle for model 1, 2, and 3 computed using equation 2 wherein the horizontal and vertical axes show the incident angle and apparent slowness, respectively.

FIG. 5 shows the apparent phase slowness for azimuthal receivers versus incident angle for model 1, 2, and 3 computed using equation 2. Table 2 shows the apparent slowness for model 1, 2, and 3 for 45 incident angle. The first column shows the apparent slowness $s_a(\pi/4)$ given by equation 2. The second column shows the formation phase slowness given by $$s_a = \frac{1}{v_c} \sin\frac{\pi}{4},\quad (27)$$

and the third column shows the averaged slowness given by $$s_a = \frac{2}{v_c + v_f},\quad (28)$$

where vc and vf are the formation and fluid velocities, respectively. sa given by equation 27 indicates the apparent phase slowness ignoring existence of the borehole. Apparent slowness is much smaller than the actual slowness shown in the second column Table 1. The averaged slowness by equation 28 provides good approximations of sa by equation 2.

Figure 6:
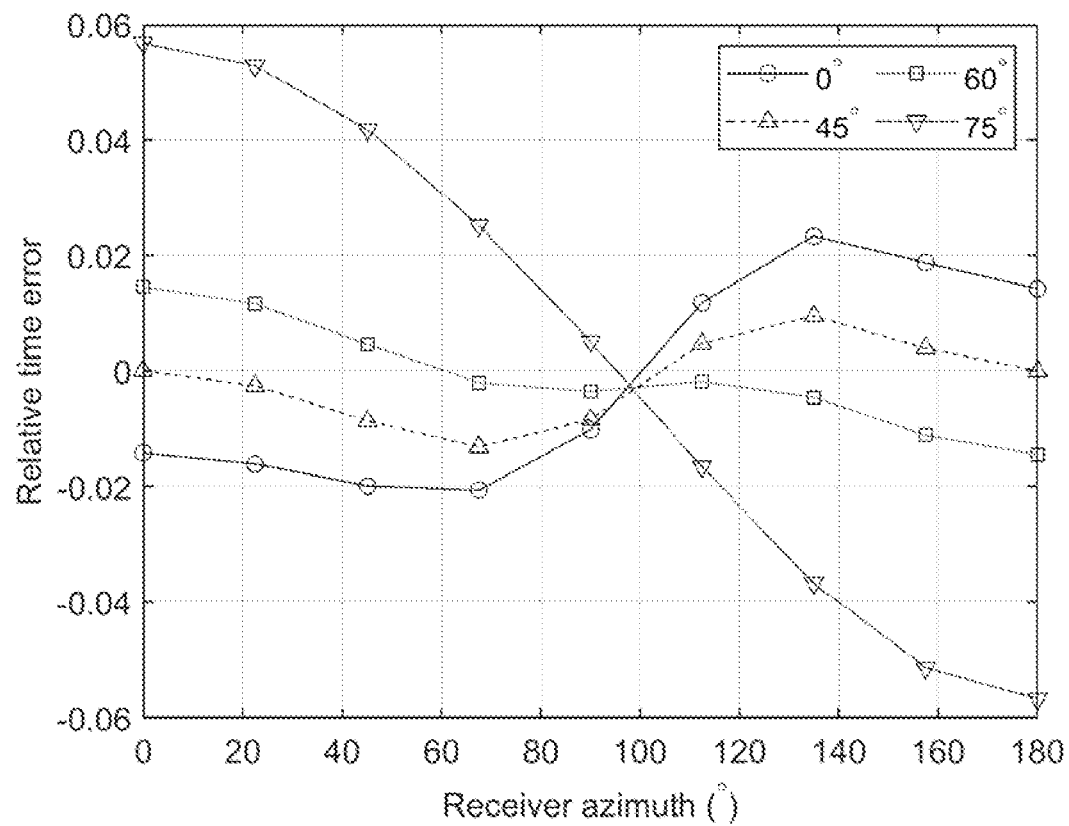
FIG. 6. is an illustration of the phase arrival time error versus receiver azimuth for model 2 wherein the time errors are computed for the times computed using the apparent phase slowness given by $s_a(¼π)$ of equation 2. The horizontal and vertical axes show the receiver azimuth and phase arrival time error, respectively.

FIG. 6 shows the computed phase arrival time error versus receiver azimuth for model 2. The time errors are computed using equation 3 and the apparent phase slowness given by $s_a(\frac{1}{4}\pi)$ of equation 2, where the reference receiver, whose time error is zero, is selected at 90° azimuth. According to FIG. 3, the maximum computed errors are within 0.12 relative time and sufficiently small. Therefore, the waveforms are effectively stacked by using equation 3.

Figure 7:
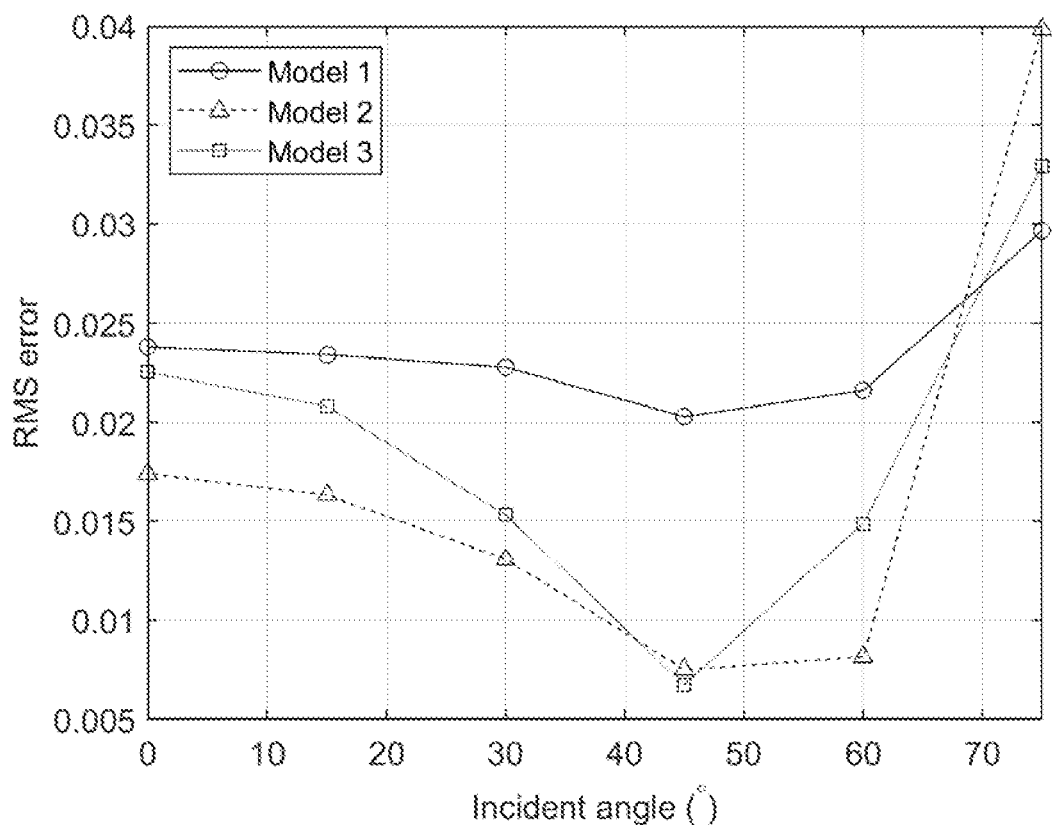
FIG. 7 is an illustration of the root mean squares error of the computed phase arrival time versus incident angle for model 1, 2, and 3 wherein the phase arrival times are computed using the apparent phase slowness given by $s_a(¼π)$ of equation 2 respectively for model 1, 2 and 3. The horizontal and vertical axes show the incident angle and RM error, respectively.

FIG. 7 shows the root mean squares (RMS) error of the computed phase arrival time versus incident angle for model 1, 2, and 3. The phase arrival times are computed using the apparent phase slowness given by $s_a(\frac{1}{4}\pi)$ of equation 2 respectively for model 1, 2, and 3. RMS errors are sufficiently small to effectively stack event signals using equation 3 comparing to the time delay versus signal amplitude shown in FIG. 3.

Incident SH-Waves

Figure 8:
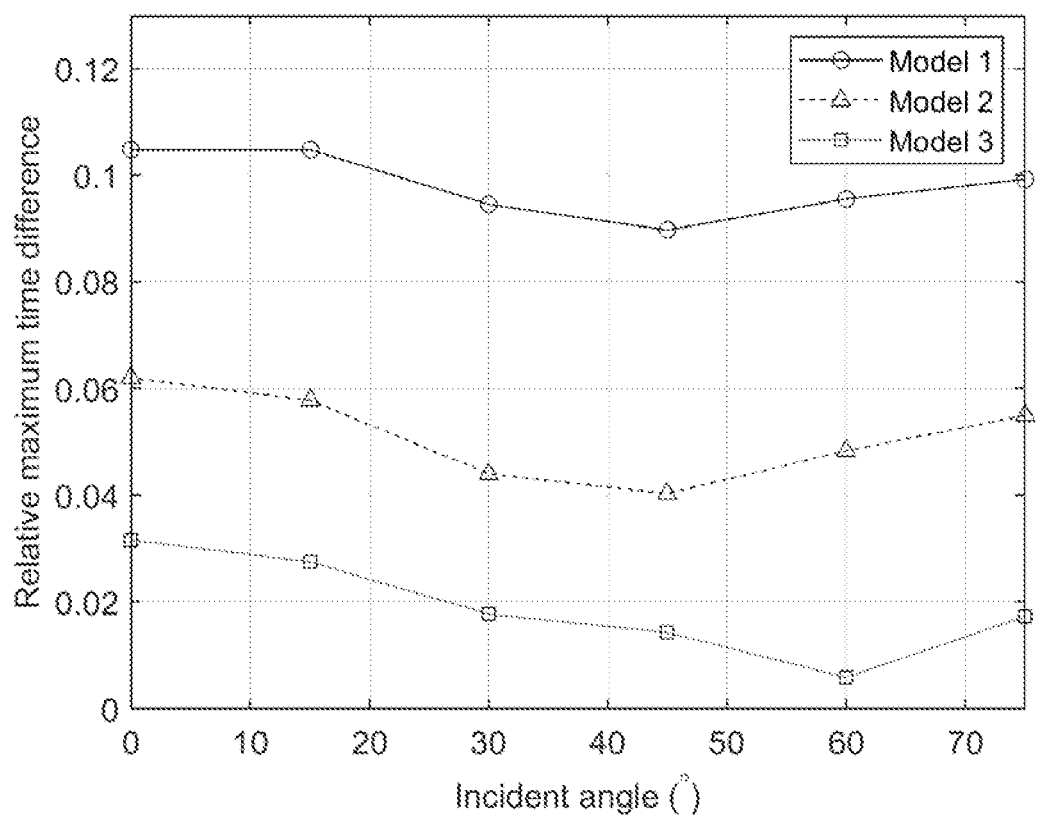
FIG. 8 is an illustration of the maximum phase arrival time difference for the azimuthal receivers versus the incident angle for the incident SH-wave for model 1, 2, and 3 wherein the horizontal and vertical axes show the incident angle and maximum time difference, respectively.

FIG. 8 shows the maximum phase arrival time difference for azimuthal receivers versus incident angle for the incident SH-wave for model 1, 2, and 3. The horizontal and vertical axes show the incident angle and maximum time difference, respectively. Because the maximum time differences are less than 0.12 for model 1, 2, and 3, the signal amplitudes are effectively increased by waveform stacking given by equation 8 without using time correction according to FIG. 3.

Figure 9:
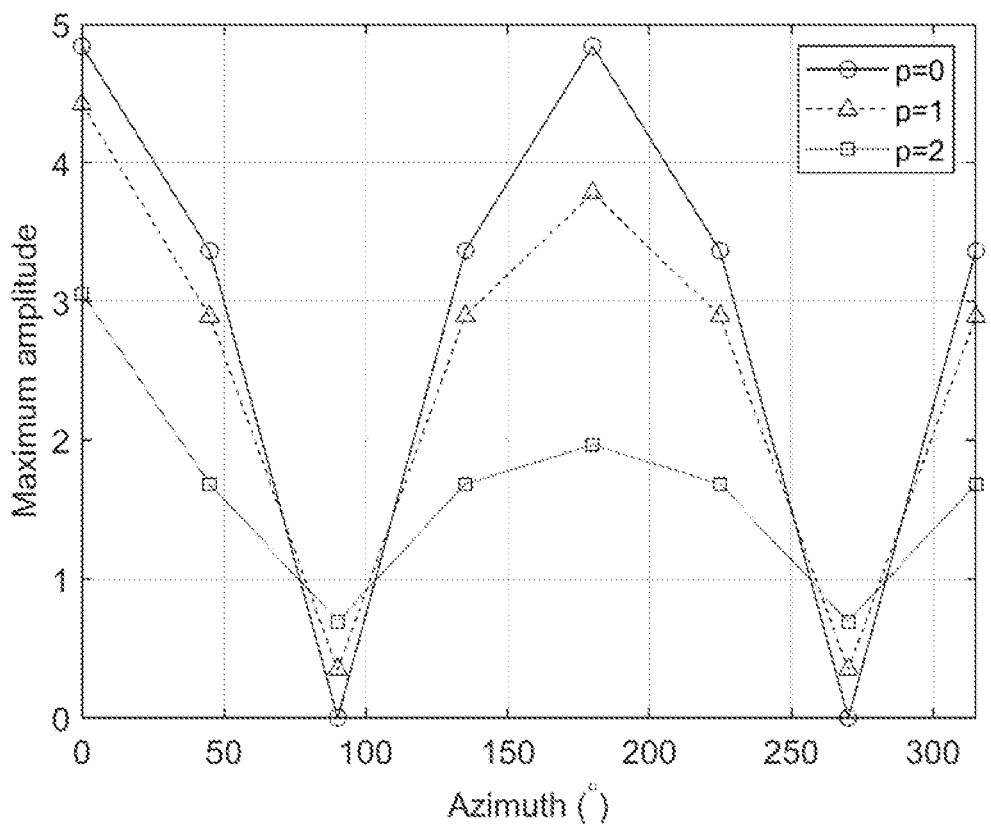
FIG. 9 is an illustration of the maximum amplitude of the stacked waveforms by equation 8 for the incident SH-waves versus the azimuth for model 2 where the incident angle is 45° wherein the horizontal and vertical axes show the azimuth for stacking and maximum amplitude of stacked waveforms, respectively. The amplitudes of waveforms stacked for p=0, 1, and 2 of equation 8 are plotted.

FIG. 9 shows the maximum amplitude of the stacked waveforms by equation 8 for the incident SH-waves versus the azimuth for model 2 where the incident angle is 45°. The amplitudes of waveforms stacked for p=0, 1, and 2 of equation 8 are shown. The maximum amplitude is larger and smaller for the azimuth parallel and vertical to the incident wave, respectively. The amplitude differences are obtained for azimuth 0° and 180° for p=1 and p=2.

Field Example

Figure 10:
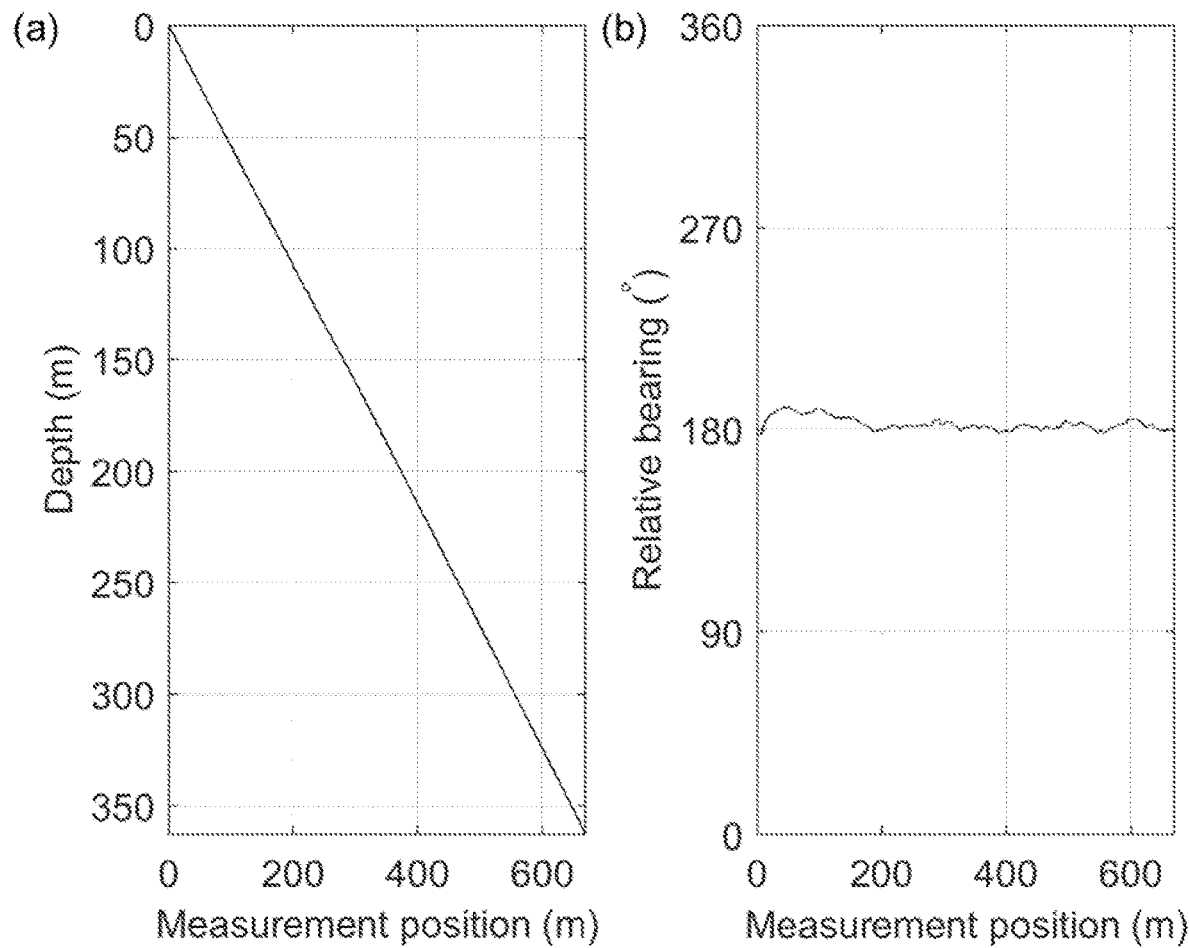
FIG. 10 is an illustration of information on well data and acquisition wherein the left and right panels show the measurement position versus depth, and the measurement position versus relative bearing of the tool, respectively.

The data shown in this subsection were acquired in a well that was deviated about 60°. The P- and S-wave velocities of the formation are about 5500 and 3000 m/s, respectively. The diameter of the borehole is about 216×10−3 m. The sonic tool has eight azimuthal receiver arrays, and each array has 13 receivers, which are spaced at 152.4×10−3 m intervals. The monopole and x-dipole sources of 8 kHz and 4 kHz central frequencies, respectively, are used. The sampling period and recording times are 10 μs and 5.12 ms, and 40 μs and 30.4 ms for the monopole and dipole sources, respectively. The relative bearing of the tool is about 180°, and the first and fifth azimuthal receiver arrays face the bottom and top, respectively. FIG. 10 shows the well trajectory and the relative bearing of the tool, respectively. The waveforms of about 650-m measurement depth interval are processed.

Figure 11:
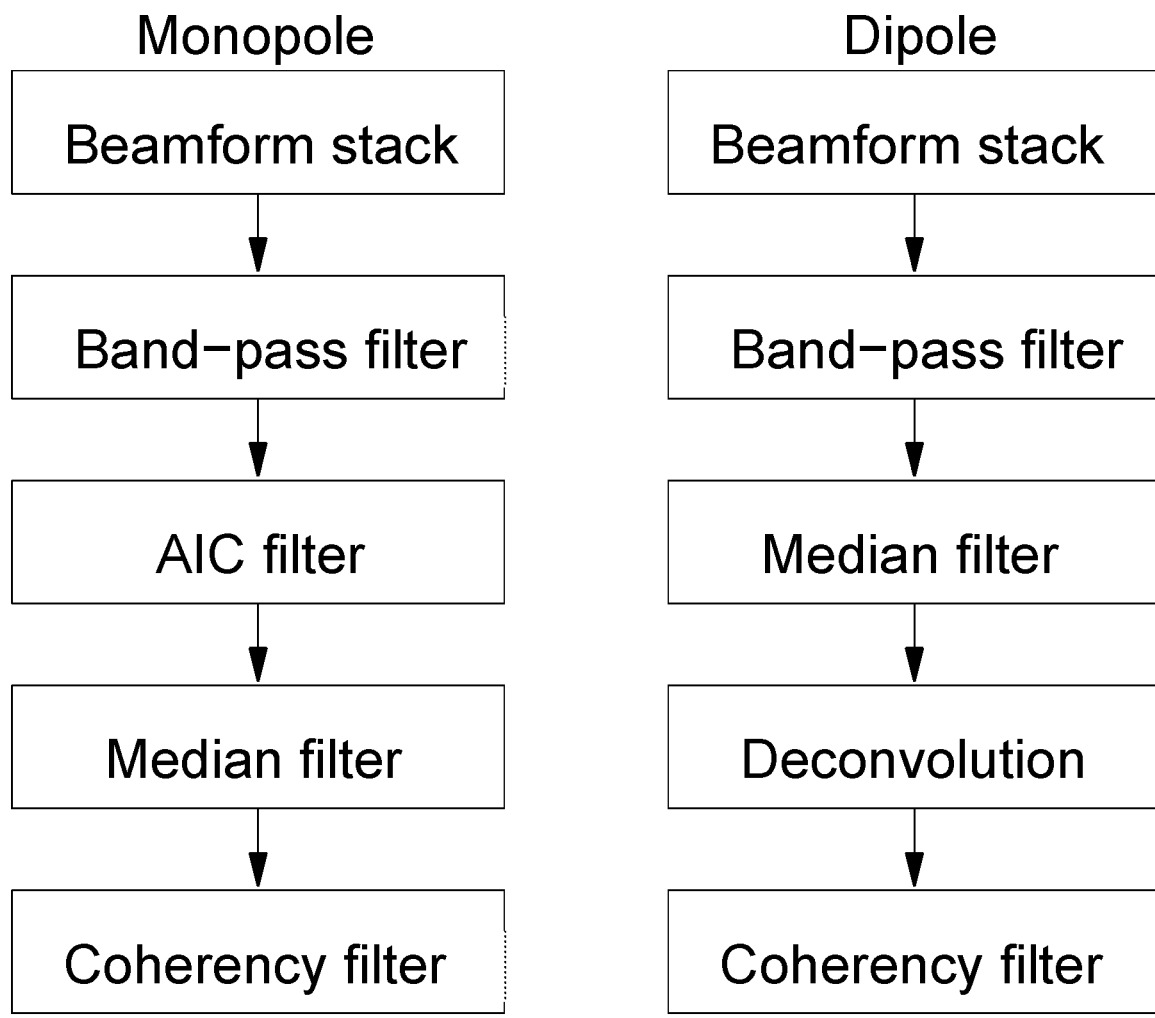
FIG. 11 is an illustration of waveform processing flows for the waveforms of the monopole and dipole sources.

FIG. 11 shows the waveform processing procedures for the monopole and dipole waveforms. The beamform stack and band-pass filters are applied to both the monopole and dipole waveforms. For the monopole waveforms, the adaptive interference canceler (AIC) filter of Haldorsen et al. (2006, 2010) is applied in the common-shot domain (CSD), which indicates the waveform gather of a single receiver array for a common shot. Then, the median filter of 0.76-m window length is applied in the common-offset domain (COD), which indicates the waveform gather of a single receiver of the tool for the entire acquisition interval. Finally, the coherency filter, which is described below, is applied in CSD to remove reflected mode waves. For the dipole waveforms, deconvolution, which is described below, is applied because a chirp source signature was used.

Figure 12:
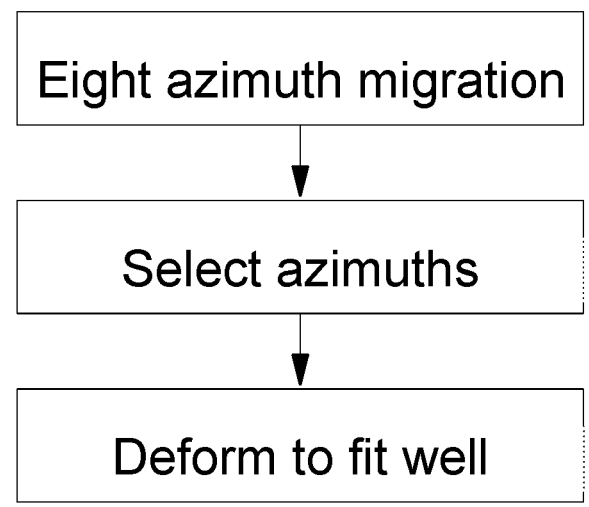
FIG. 12 is an illustration of a migration processing procedure wherein eight azimuth waveforms are individually migrated at first for the waveforms of each azimuth, and then deformed to fit the actual geometry.

FIG. 12 shows the migration procedure. The waveforms of eight azimuthal arrays are individually migrated along the measurement positions, and eight images are created.

Then, the images, in which reflectors are contained, are selected. Finally, the images are deformed to fit the Earth coordinates.

The trial reflector migration method of Hirabayashi (2016) is used for the following examples. The acquired waveforms are fully beamform to the reflectors by using the trial reflector migration because the beamform stack beamforms the waveforms in the azimuthal direction, and the trial reflector migration beamforms the images in the direction of the measurement positions.

Figure 13:
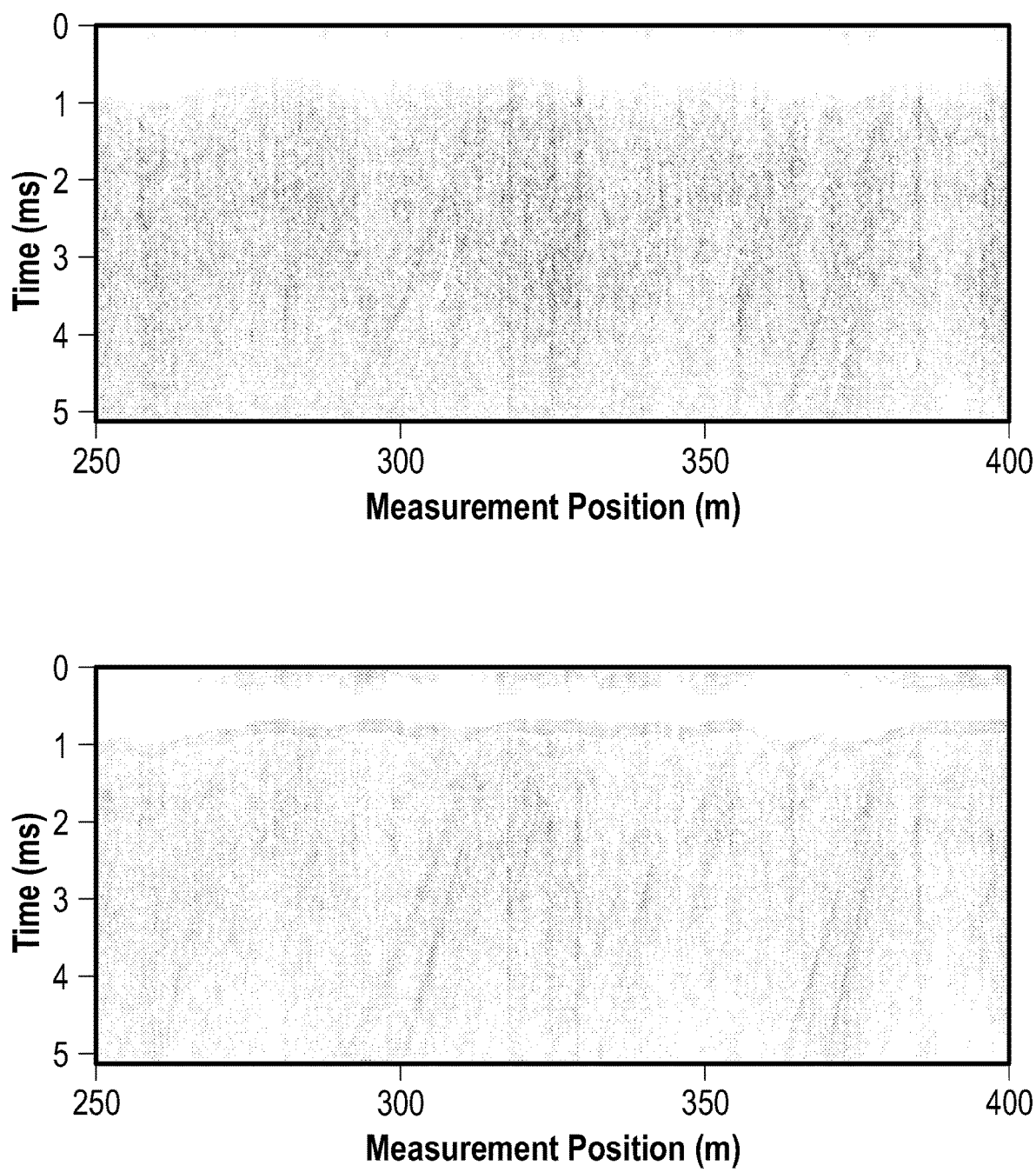
FIG. 13 is an illustration of filtered waveforms of the monopole source without and with the beamform stack shown in the common-offset domain wherein the horizontal and vertical axes show the measurement position and recording time, respectively. The top and bottom panels show the waveforms acquired by a single receiver located at 180° azimuth, and those beamform stacked oriented to 180° azimuth, respectively. The measurement depth interval is between 250 and 400 m.

FIG. 13 shows the filtered waveforms of the monopole source shown in COD without and with the beamfrom stack. Equation 28 is used for the apparent slowness of the beamform stack. FIGS. 13a and 13b show the waveforms acquired by a single receiver located at 180° azimuth, and those beamformed to 180° azimuth, respectively. The measurement depth interval between 250 and 400 m is selected. The beamformed waveforms are less noisy, and event signals are more clearly observed.

Figure 14:
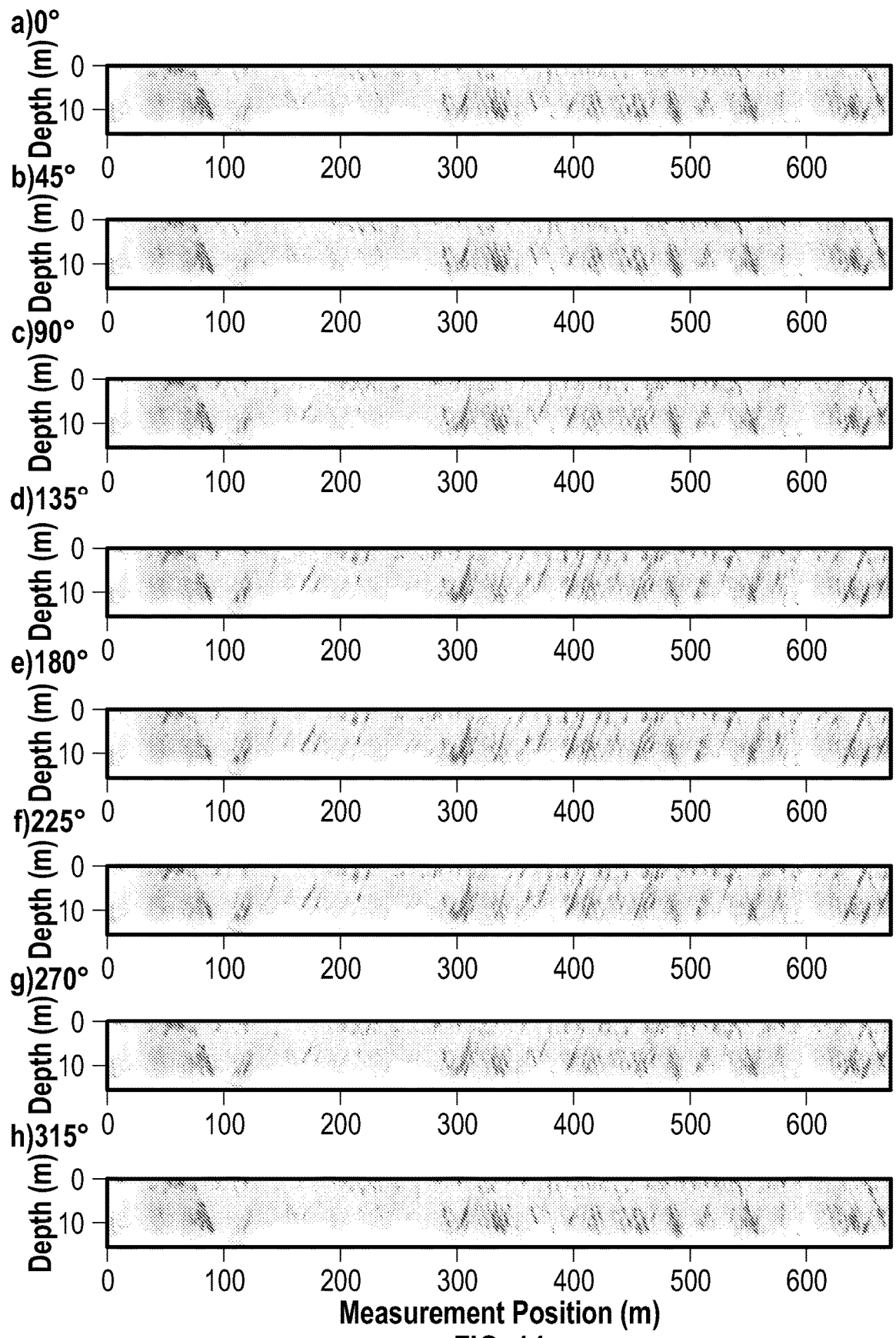
FIG. 14 is an illustration of migration images for the beamform stacked waveforms for eight azimuths. Panels (a)-(h) show the images from 0° azimuth at 45°-intervals. The horizontal and vertical axes show the measurement depth and the depth from the center of the well, respectively.

FIG. 14 shows eight azimuthal migration images for the beamform stacked waveforms.

The horizontal and vertical increments of the migration images are 76.2×10−3 and 30.48×10−3 m, respectively. FIG. 14a~14h show the azimuthal images from 0° azimuth at 45° intervals. The trends of event appearances are gradually changed by azimuths, and the down- and up-events mainly appear at 0° and 180°, respectively.

Figure 15:
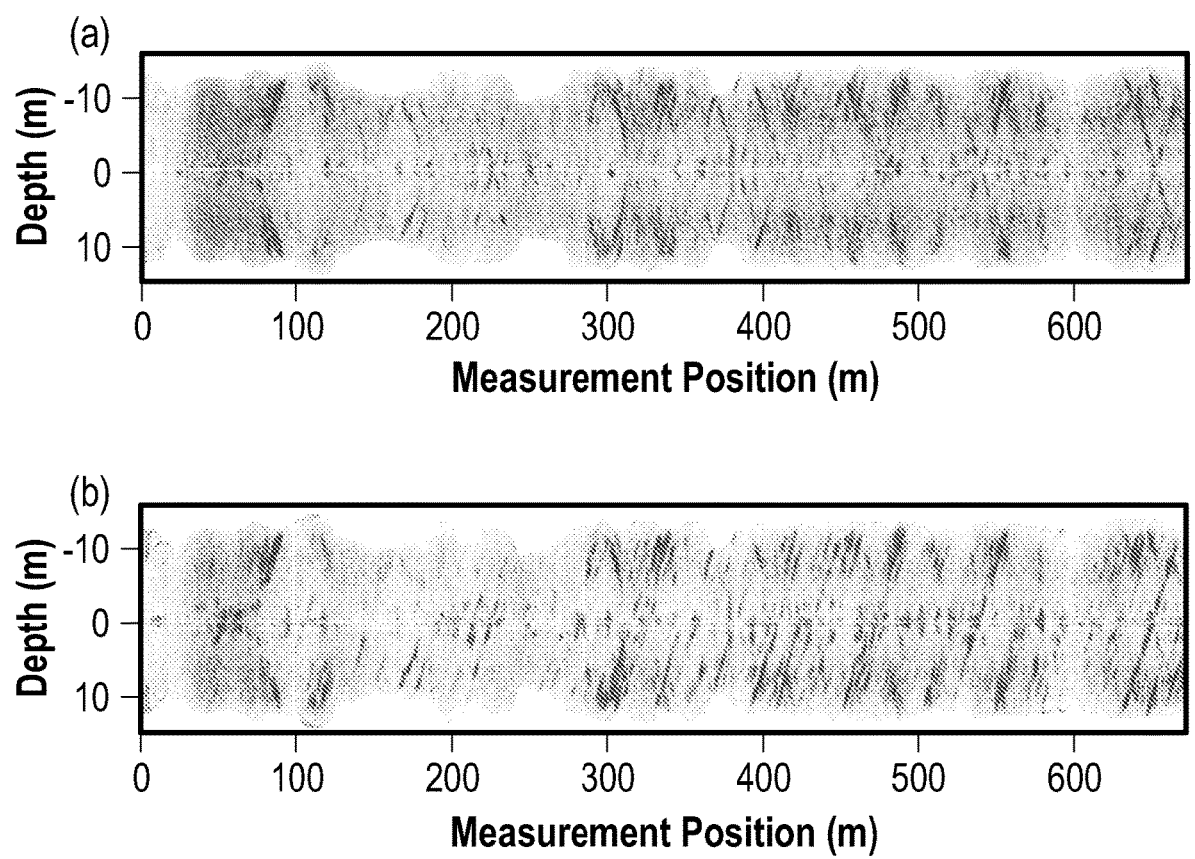
FIG. 15 is an illustration of migration images for the waveforms without and with the beamform stack for the monopole source. The top and bottom panels show the images for the waveforms without and with the beamform stack, respectively. The horizontal and vertical axes show the measurement depth and the distance from the center of the well, respectively.

FIG. 15 shows the comparisons of migration images for the waveforms without and with the beamform stack. The top and bottom panels show the images without and with the beamform stack, respectively. FIG. 15b shows the clean and well-focused image. It also shows the better azimuth separation of the reflectors.

The azimuths of reflectors are analyzed using the following method. The reflector depth for the measurement position is given by $$c(x) = \max_{z,j} g_j^*(x, z), \quad (29)$$

where j is the azimuth of the migration image, and $g_j^*(x,z)$ is the envelope of image $g_j(x,z)$. $j(x)$ and $z(x)$ are taken for j and z, which provide $c(x)$. The reflection points, whose relative amplitude is greater than 5%, are selected. The azimuth of reflector is computed using a quadratic interpolation (Hirabayashi et al., 2017).

Figure 16:
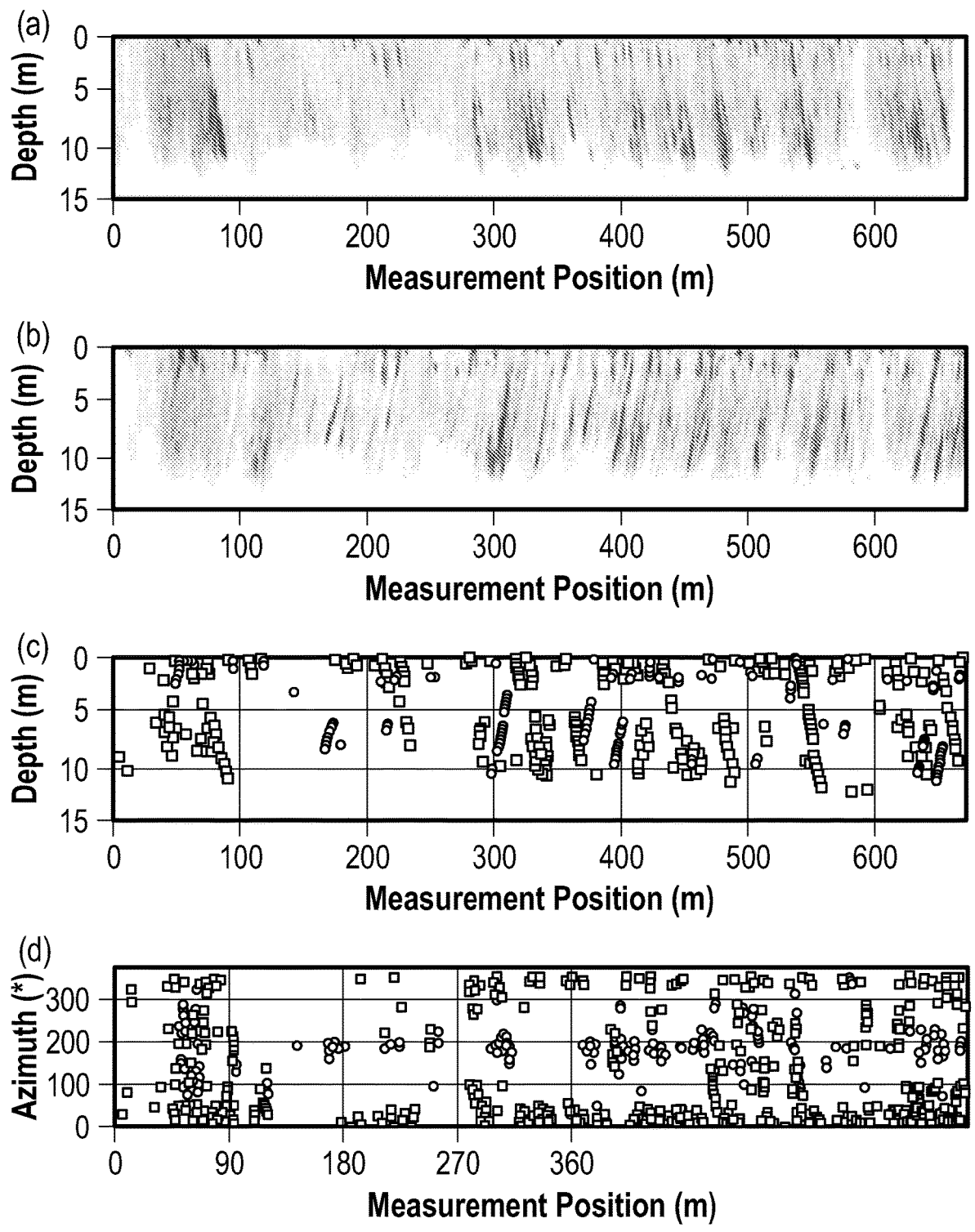
FIG. 16 is a plot of azimuth analysis of the reflectors for the monopole source. Panels (a) and (b) show the down- and up-dip migration images, respectively. Panels (c) and (d) are the picked reflectors and azimuths, respectively. The horizontal axes show the measurement depth. The vertical axes of panel (a)-(c) and (d) show the distances from the center of the well and the azimuth of the reflector, respectively. Red and blue circles show the reflectors and azimuths of the down- and up-dip reflectors, respectively.

FIG. 16 shows the azimuth analysis of reflectors for the monopole source. FIGS. 16a and 16b show the down- and up-dip migration images (equations 19 and 20 of Hirabayashi, 2016), respectively. FIGS. 16c and 16d are the picked reflector and azimuths, respectively. Red and blue circles show the reflectors and azimuths of the down- and up-dip reflectors, respectively.

Beamform Stack for Dipole Waveforms

Figure 17:
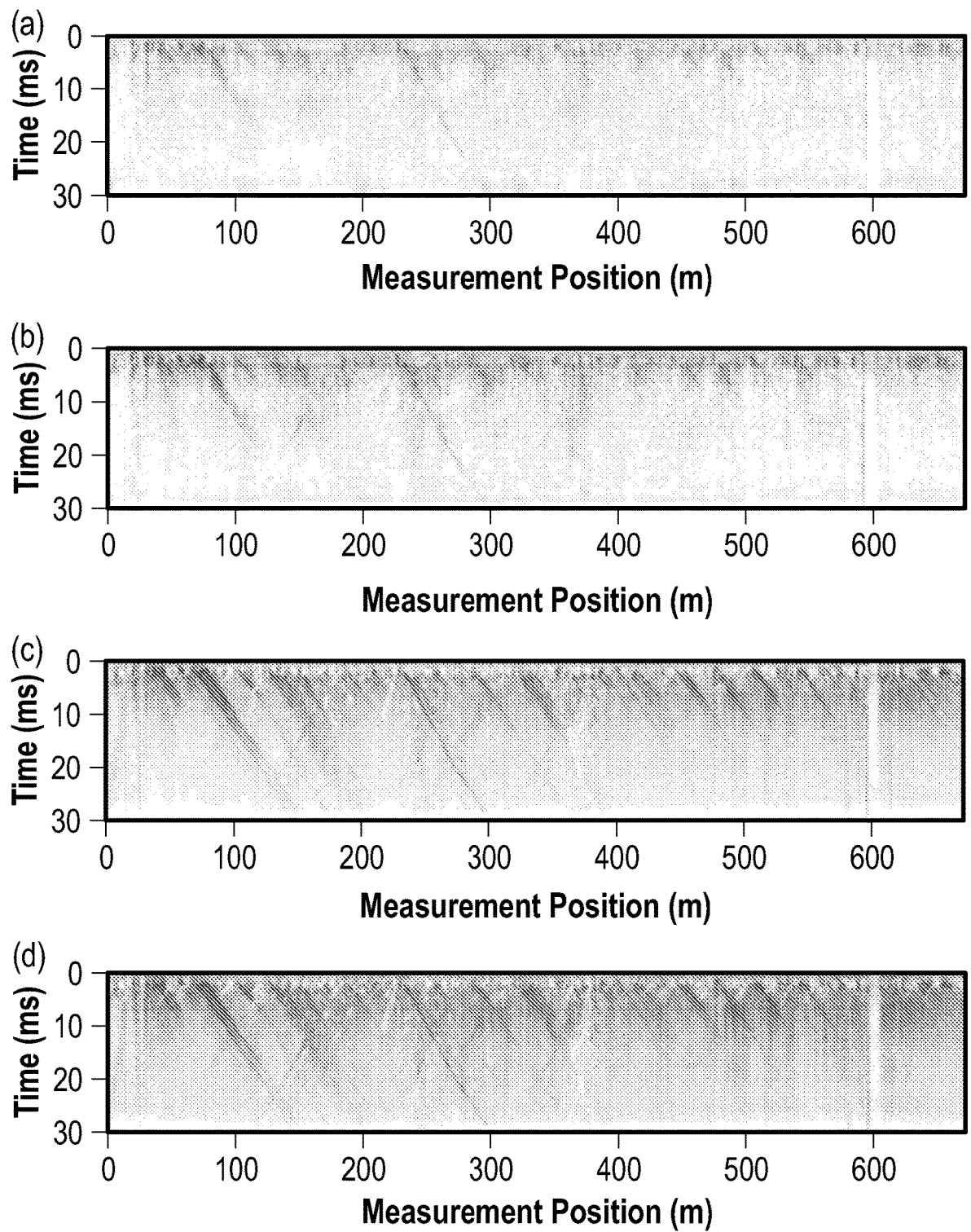
FIG. 17 is an illustration of filtered waveforms of the dipole source. Panel (a) shows the waveforms of a single receiver located at 90° azimuth. Panel (b) shows the waveforms of the dipole receiver, which are constructed using two receivers located at 90° and 270°. Panels (c) and (d) show the beamformed waveforms oriented to 0° azimuth stacked using p=2 and p=0 of equation 8, respectively.

FIG. 17 shows the filtered waveforms of the dipole source. FIG. 17a shows the waveforms of a single receiver located at 90° azimuth. FIG. 17b shows the waveforms of the dipole receiver, which is constructed by subtracting the waveforms of the receivers located at 90° and 270°. FIGS. 17c and 17d show the beamformed waveforms oriented to 0° azimuth stacked using p=2 and p=0 of equation 8, respectively. The event signals of the stacked waveforms have higher S/N as the number of the receivers for stacking increases.

Figure 18:
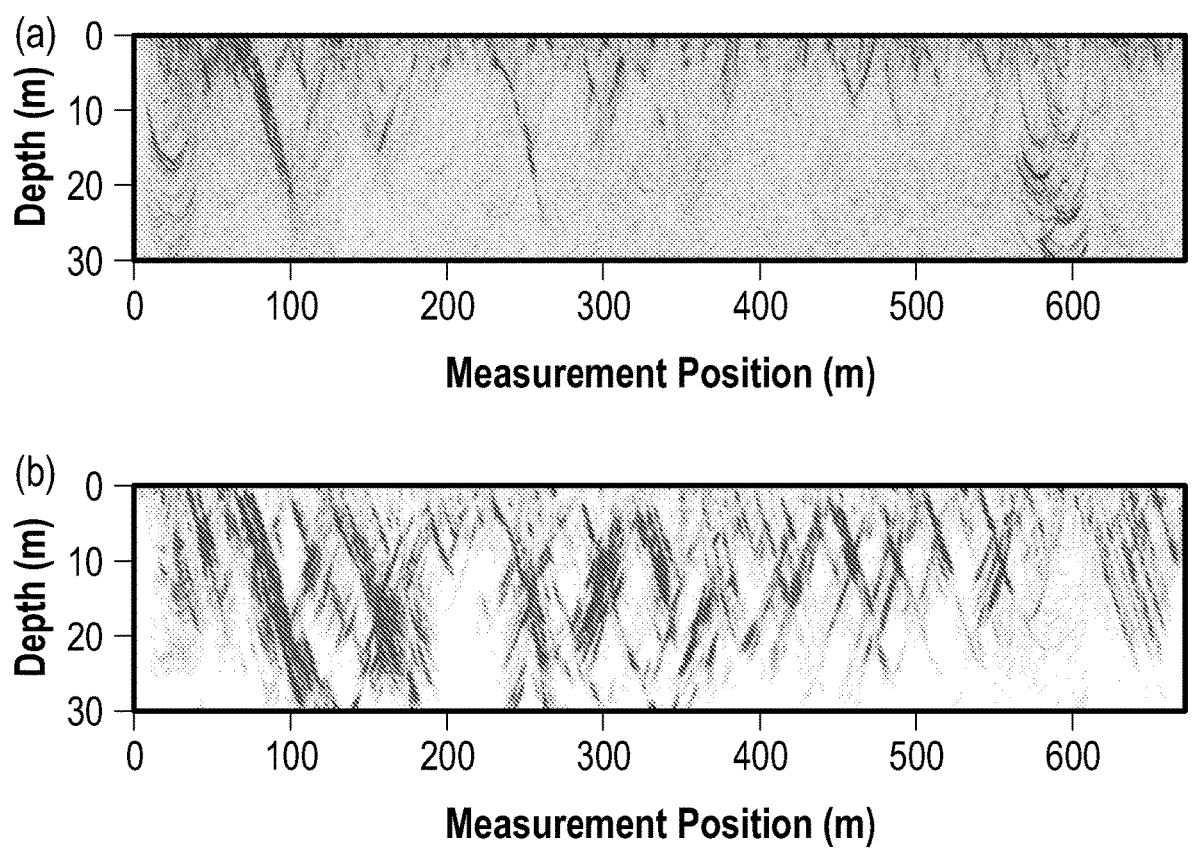
FIG. 18 is an illustration of a comparison of migration images for the dipole source. The top and bottom panels show the images for the waveforms of the dipole receiver and the beamformed waveforms, respectively. The horizontal and vertical axes show the measurement position and the depth from the center of the well, respectively.

FIG. 18 shows the comparison of migration images for the dipole source. The horizontal and vertical increment of migration images are the same as those used for the monopole source. FIGS. 18a and 18b show the images for the waveforms of the dipole receiver and the beamformed waveforms for p=0. A cleaner image is obtained in FIG. 18b, and some events cannot be imaged in FIG. 18a.

Figure 19:
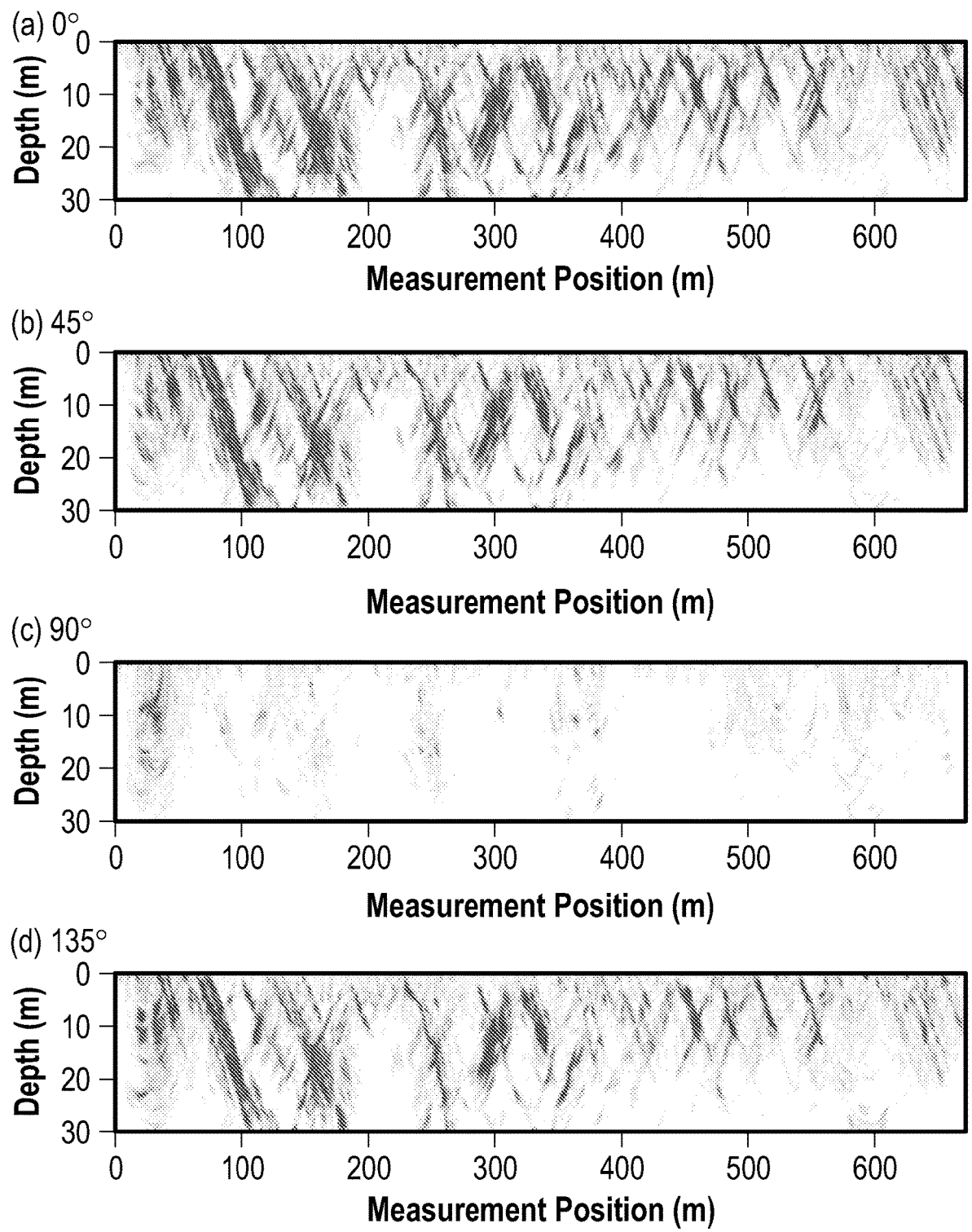
FIG. 19 is an illustration of a comparison of migration images oriented to various azimuths for the dipole source. The horizontal and vertical axes show the measurement position and the depth from the center of the well, respectively. From the top panel, the images are oriented to 0°, 45°, 90°, and 135° azimuths, respectively. The images have 180° azimuth ambiguities.

FIG. 19 shows the comparisons of migration images for the beamformed waveforms oriented to various azimuths. From the top panel, the images are oriented to 0°, 45°, 90°, and 135°, respectively. The images have 180° azimuth ambiguities. The images oriented to 0° and 90° show the largest and smallest amplitudes, respectively. Clear azimuth separation is obtained by equation 8.

Figure 20:
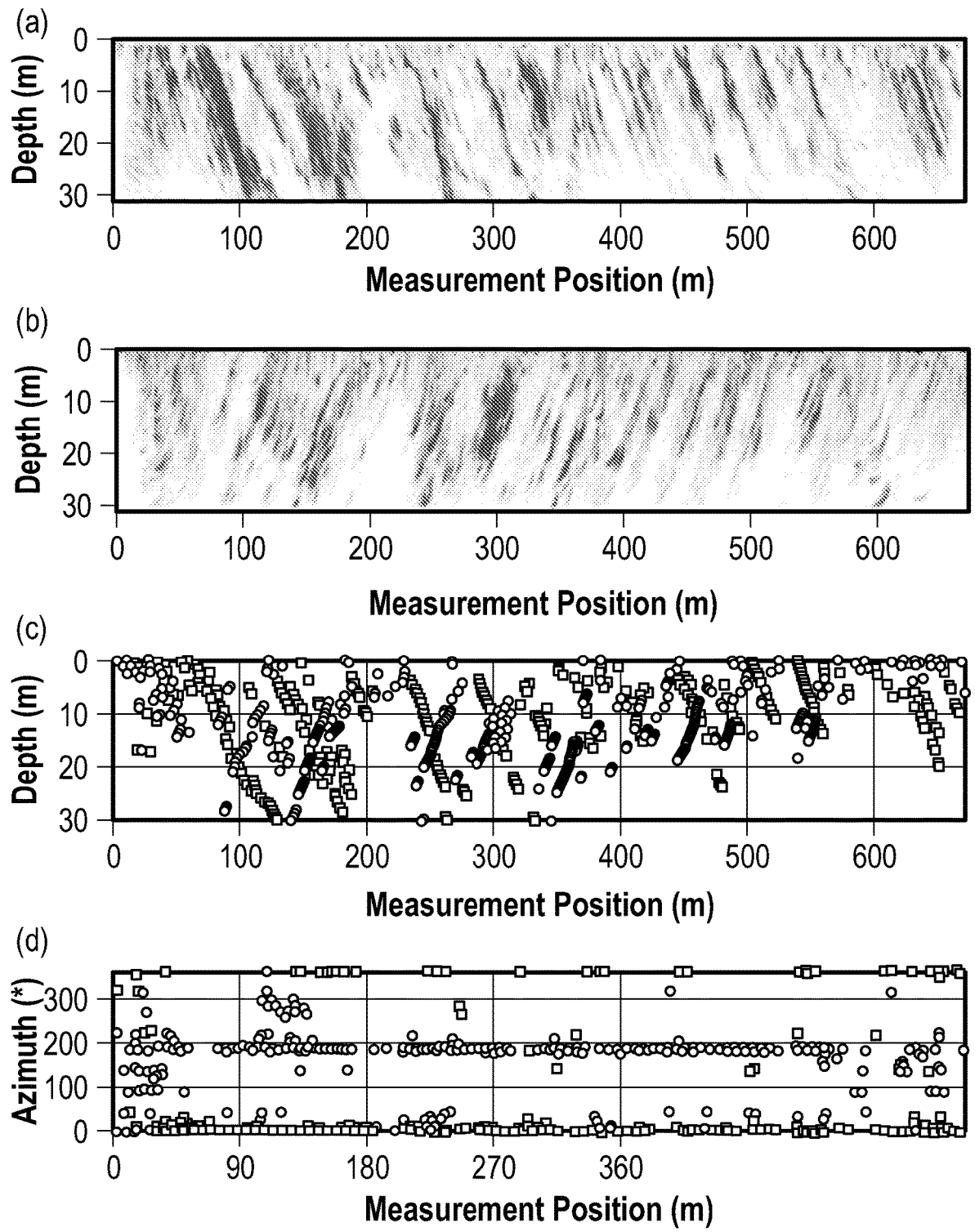
FIG. 20 is an illustration of azimuth analysis of the reflectors for the dipole source. Panels (a) and (b) show the down- and up-dip migration images, respectively. Panels (c) and (d) are the picked reflector and azimuths, respectively. The horizontal axes show the measurement depth. The vertical axes of panels (a)-(c) and (d) show the distances from the center of the well and the azimuth of the reflector, respectively. Red and blue circles show the reflectors and azimuths of the down- and up-dip reflectors, respectively.

FIG. 20 shows the plot of the azimuth analysis of reflectors for the dipole source, where p=2 is used for the beamform stack. The reflection points are picked by the same method for the monopole source, and the reflection points, whose relative amplitude is greater than 3%, are selected. FIGS. 20a and 20b show the down- and up-dip migration images, respectively. FIGS. 20c and 20d are the picked reflectors and azimuths, respectively, where equation 29 and the quadratic interpolation (Hirabayashi et al., 2017) are used to pick the events and azimuths as the same for the monopole source. Red and blue circles show the reflectors and azimuths of the down- and up-dip reflectors, respectively, where equation 24 is used to resolve 180° ambiguities. The down- and up-reflectors exist consistently at 0° and 180° azimuths, respectively.

Comparison with Dips and Azimuths from Resistivity Image

Figure 21:
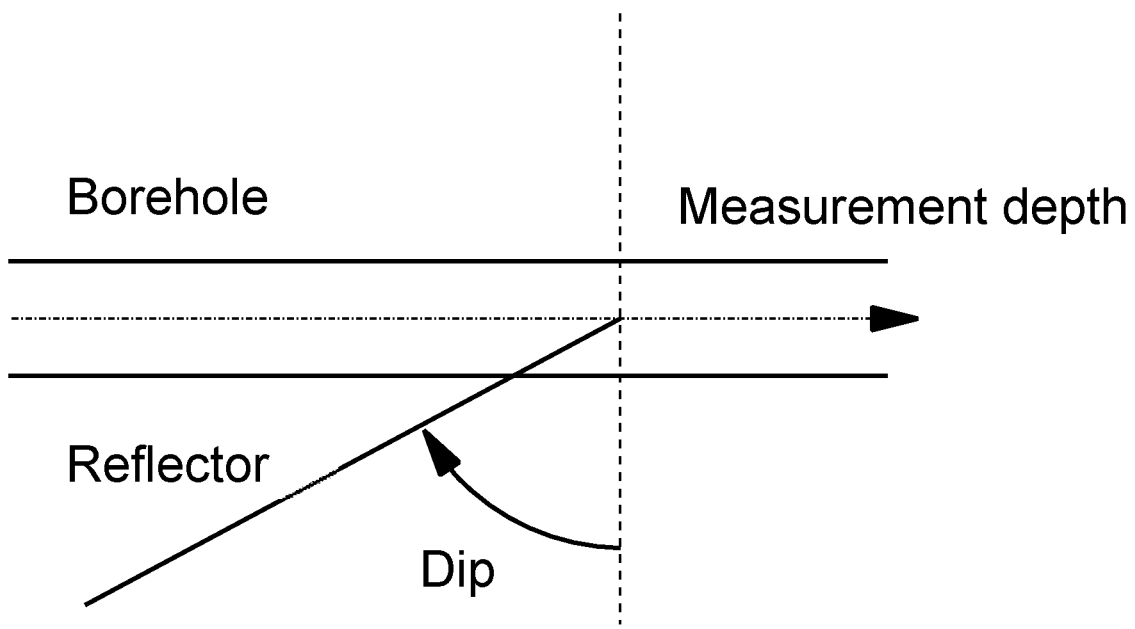
FIG. 21 is an illustration of dip relative to a well.
Figure 22:
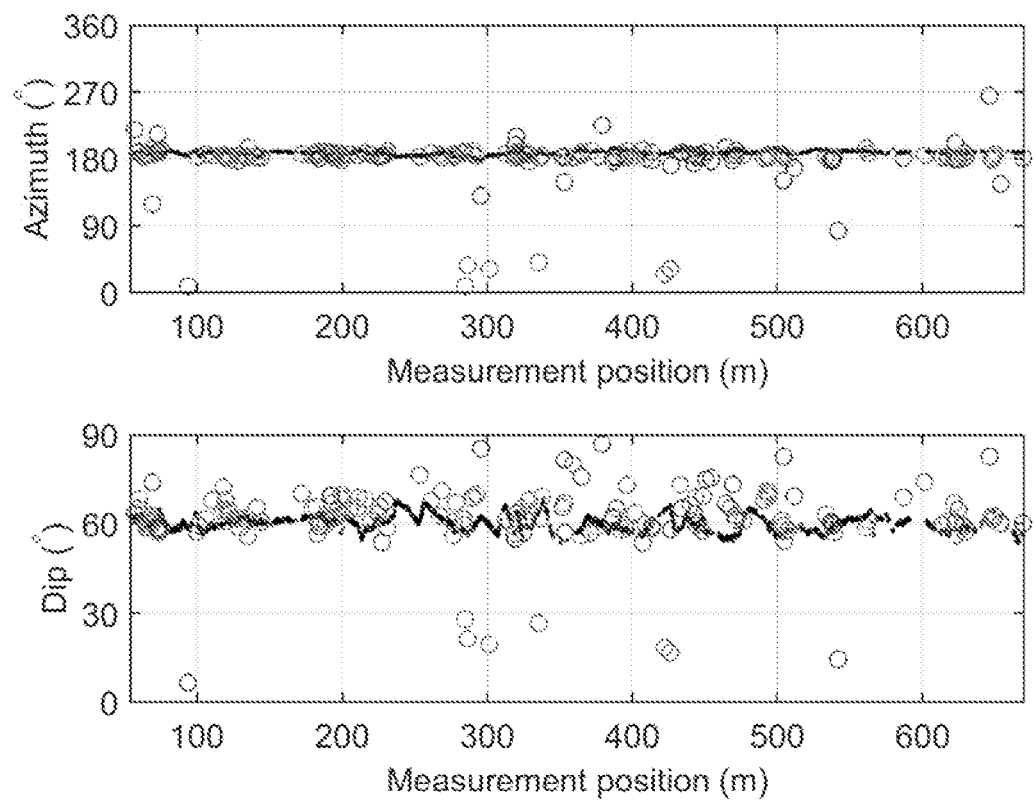
FIG. 22 is an illustration of a comparison of azimuths and dips obtained by aspects of the disclosure and those obtained from a resistivity image of the borehole. The top and bottom panels show the azimuths and dips versus the measurement position, respectively. The black dot shows the dip and azimuth by the resistivity image, and blue and red circles show the dip and azimuth obtained from the monopole and dipole images, respectively.

As described herein, the dips and azimuths of the reflectors are compared to those given by a resistivity image of the same well. The dips of the reflectors are obtained by a following procedure. The adjacent reflection points are grouped when $$|z(i\Delta x) - z((i+1)\Delta x)| < \Delta Z_c \quad (30)$$

holds, where $\Delta x$ is the horizontal increment of the migration image, and $\Delta Z_c$ is a constraint, where $$\Delta Z_c = \Delta x \tan\left(\frac{\pi}{3}\right), \quad (31)$$

is used. When the number of reflection points in a group is less than Ng, the dip and azimuth for the group is not estimated, where Ng=11 is used. A linear fit is applied to the reflection points, and the dip is computed from the gradient of the linear equation. The azimuth for the group is determined by taking median of azimuths of the reflection points. The linear equation is also used to obtain intersections of the reflector and the well. The definitions of the relative azimuth and dip are shown in FIGS. 1 and 21, respectively. FIG. 22 shows the comparison of the azimuths and dips by the new methods and those obtained by the resistivity image of the borehole. FIGS. 22a and 22b show the azimuths and dips versus the measurement position, respectively. The black dot shows the dip and azimuth by the resistivity image, and blue and red circles show the dip and azimuth obtained from the monopole and dipole images, respectively. The intersections from both the up- and down-dip reflectors are shown. Therefore, the same intersection can be shown twice. Because a single reflector might be separated to multiple reflectors by equation 30, multiple intersections for a single reflector will be also displayed. The intersections of the resistivity image are quite dense, however, those from the migration image only shows the interfaces, which have larger acoustic impedance. The trend of the dips and azimuths form the migration image and the resistivity image agrees very well. The number of outliers can be reduced by increasing the minimum amplitudes to pick events and Ng, however, the number of correctly estimated events is also decreased.

Figure 23:
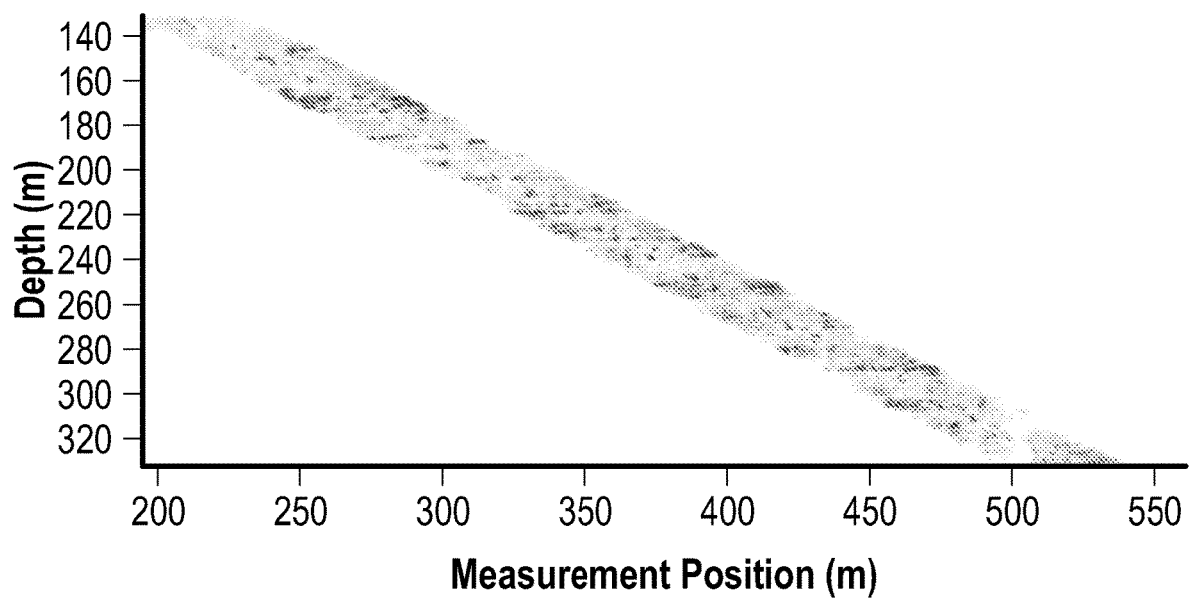
FIG. 23 is an illustration of migration images shown in the Earth coordinates. The top and bottom panels show the images for the monopole and dipole sources, respectively, between about 250 and 600-m measurement depth interval. The horizontal and vertical axes show the horizontal distance and the depth, respectively.
Figure 23:
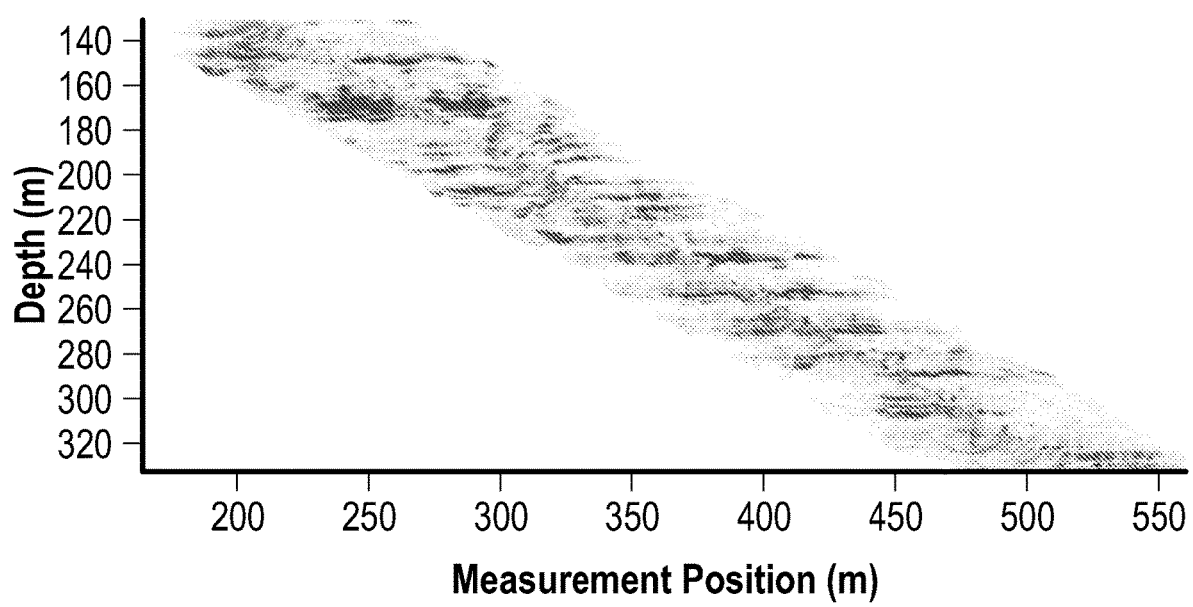

FIG. 23 shows the migration images shown in the Earth coordinates. The top and the bottom images show the migration images for the monopole and dipole sources, respectively. The dipole image shows wider extensions of the reflectors than the monopole image. The reflector positions are consistent with the monopole and dipole images.

The phase arrival difference will be usually different from the first arrival because the observed waveforms are a superposition of the waveforms that propagate through the borehole wall at many positions.

Table 2 shows that neither phase slowness of formation nor fluid slowness, which is about 650 μs/m, is not appropriate for time compensation for stacking the event signals of the incident P-waves. The wave propagation in the borehole must be taken into account for stacking.

Migration methods, which can precisely compute wave propagation in the borehole, such as reverse time migration (RTM), will be able to beamform the event signals. However, because of the small borehole size compared to the wavelength and the low fluid velocity, RTM will require huge computational time.

FIG. 9 shows the amplitude differences for azimuths 0° and 180° for p=1 and p=2 of equation 8. They can be used to resolve 180° ambiguity of the back-azimuth when the tool is centered well because the amplitude is changed by tool positions in the borehole.

The tool may not be centered well especially for the horizontal deviated wells.

The position of the beamform stack in the waveform processing shown in FIG. 11 can be changed, and further investigation is necessary to understand the effects of the position. For the dipole source, because the beamform stack efficiently removes monopole components in the waveforms, the first use of beamform stack is effective.

Accuracy of the azimuths and dips shown in FIGS. 16, 20, and 22 is improved by using sophisticated horizon picking methods (for example, Hoyes and Cheret, 2011), however, a simple procedure was used to limit the scope of discussions in this study. The phase arrival differences of the incident P-waves, whose central frequency is 8 kHz, for azimuthally spaced receivers are sufficiently compensated for stacking by selecting an appropriate apparent phase slowness regardless of the incident angles. The beamform stack methods enhance the event signals of the incident P- and SH-waves, whose central frequencies are 8 and 4 kHz, for the back-azimuth of the incident waves. The signal-to-noise ratio of the stacked waveforms is greatly improved for the waveforms of the monopole and dipole sources. Migration images for the stacked waveforms of both the monopole and dipole sources show better signal-to-noise ratio than those of unstacked waveforms. The directions of reflectors can be determined from the migration images for the waveforms of the monopole and dipole sources without having 180° ambiguities.

Coherency Filter

Hirabayashi (2016) successfully applied a coherency method to migration and obtained high resolution images for sonic imaging. A similar idea is used for wavefield separation especially to remove mode waves. The coherency filter shown here detects and removes mode waves in common shot gathers of sonic waveforms for specified slowness, s. A slowness range, S, which is equally sampled to detect the mode waves, is given by $$s_{min} \leq s \leq s_{max}, \quad (A\text{-}1)$$

$$-s_{max} \leq s \leq -s_{min}, \quad (A\text{-}2)$$

where $s_{min}$ and $s_{max}$ are the minimum and maximum slowness, respectively. Suppose a waveform trace is denoted by $f_j(t)$, where j is the receiver index, and t is the recording time. Then, relative travel time differences of a mode wave for the slowness, s, for the receivers are given by $$\tau_j(s) = s \cdot (d_j - d_c), \quad (A\text{-}3)$$

where di and de are the source-receiver distances of the jth and central receivers, respectively. The time shifted waveform trace is defined as $$f_j^0(s,t) = f_j(t + \tau_j(s)), \quad (A\text{-}4)$$

and cross correlation is continuously computed for $f_j'(s,t)$ as $$c_j = (s, t) = \frac{\int_{-T}^{T} f_j'(s, t+\tau) f_c(\tau) d\tau}{\left[\int_{-T}^{T} f_j'^2(s, t+\tau) d\tau \int_{-T}^{T} f_c^2(\tau) d\tau\right]^{1/2}}, \quad (A\text{-}5)$$

where T is a half window length of cross correlation. Waveform trace and cross correlation function, which are independent of receiver indices, are created by taking the median for receiver indices as $$F(s, t) = \underset{j}{\text{median}}[f_j'(s, t)], \quad (A\text{-}6)$$

$$C(s, t) = \underset{j,\, j \neq c}{\text{median}}[c_j(s, t)]. \quad (A\text{-}7)$$

Time-shifts are applied to equations A-6 and A-7, and waveform traces and cross correlation functions for receiver indices are created as $$f_j''(s,t) = F(s, t - \tau_j(s)), \quad (A\text{-}8)$$

$$c_j^0(s,t) = C(s, t - \tau_j(s)). \quad (A\text{-}9)$$

The waveform trace containing the mode waves are constructed as $$\bar{f}_j(t)=f_j''(s^0,t),\quad\text{(A-10)}$$

where $s^0$ is selected so that $$|f_j''(s^0, t)| = \max_{s\in S^0}|f_j''(s, t)|,\quad\text{(A-11)}$$

where $S^0$ is given by $$S^0=\{s\in S|c_j'(s,t)\geq C_{lim}\},\quad\text{(A-12)}$$

where $C_{lim}$ is a threshold. The filtered waveforms are given by $$fb_j(t)=f_j(t)-\bar{f}_j(t).\quad\text{(A-13)}$$

Alternatively, the filtered waveforms are given by $$fb_j(t)=0,\quad\text{(A-14)}$$

for s and t, which satisfy equation A-12.

Deconvolution of Chirp Signal

A chirp source signature is used in the dipole acquisition, and it is also used in the acquisition for sonic imaging. Because the dominant event signals are delayed from their first arrivals because the amplitudes of event signals are in a limited frequency band, time correction is required. We applied semblance weighted deconvolution by Haldorsen et al. (1994) to the filtered waveforms. The deconvolution is essentially expressed in the frequency domain as $$f_d(\omega) = \frac{f(\omega)s^*(\omega)}{|s(\omega)|^2},\quad\text{(B-1)}$$

where $f(\omega)$ and $s^*(\omega)$ are the input waveform and complex conjugate of source signature, respectively.

Tables

TABLE 1

Formation properties of computational models.

| | Density kg/m³ | P-velocity m/s | S-velocity m/s |
|---|---|---|---|
| Model 1 | 2000.0 | 3000.0 | 1650.0 |
| Model 2 | 2000.0 | 4500.0 | 2475.0 |
| Model 3 | 2000.0 | 6000.0 | 3300.0 |

TABLE 2

Phase slowness for the azimuthal receivers.

| | Apparent slowness µs/m | Formation phase slowness µs/m | Average slowness µs/m |
|---|---|---|---|
| Model 1 | 447 | 236 | 444 |
| Model 2 | 335 | 157 | 333 |
| Model 3 | 237 | 117 | 267 |

A method for processing of a sonic monopole waveform is described. The method may comprise obtaining a beamform stack of the sonic monopole waveform to produce a first result. The method may also comprise performing a band-pass filtering on the first result to produce a second result. The method may also comprise performing an adaptive interference canceler filtering on the second result to produce a third result. The method may also comprise performing a median filtering on one of the third result to produce a fourth result. The method may also comprise performing a coherency filtering on the fourth result to produce a final processing of the sonic monopole waveform.

In another example embodiment, the method may be performed, wherein the beamform stack occurs for P waves of the sonic signal.

In another example embodiment, the method may be performed, wherein the beamform stack occurs for S waves of the sonic signal.

In another example embodiment, the method may be performed, wherein the adaptive interference canceler filter is applied to a common shot domain of the sonic signal of the monopole source.

In another example embodiment, the method may be performed, wherein the median filter is applied to a common-offset domain.

In another example embodiment, the method may be performed, wherein the sonic monopole waveform is received at 8 receivers in a downhole tool.

In another example embodiment, the method may be performed, wherein each of the 8 receivers is located at a different azimuth than other receivers.

In another example embodiment, a method for processing of a sonic dipole waveform is disclosed. The method may comprise obtaining a beamform stack of the sonic dipole waveform to produce a first dipole result. The method may further comprise performing a band-pass filtering on the first dipole result to produce a second dipole result. The method may also comprise performing a median filtering on one of the second dipole result to produce a third dipole result. The method may also comprise performing a deconvolution on the third result to produce a fourth dipole result. The method may also comprise performing a coherency filtering on the fourth result to produce a final processing of the sonic dipole waveform.

In another example embodiment, the method may be performed, wherein the beamform stack occurs for P waves of the sonic signal.

In another example embodiment, the method may be performed, wherein the beamform stack occurs for S waves of the sonic signal.

In another example embodiment, the method may be performed, wherein the median filter is applied to a common-offset domain.

In another example embodiment, the method may be performed, wherein the sonic monopole waveform is received at 8 receivers in a downhole tool.

In another example embodiment, the method may be performed, wherein each of the 8 receivers is located at a different azimuth than other receivers.

What is claimed is:

1. A method for processing of a sonic monopole waveform, comprising:
    obtaining a beamform stack of the sonic monopole waveform to produce a first result;
    performing a band-pass filtering on the first result to produce a second result;
    performing an adaptive interference canceler filtering on the second result to produce a third result;
    performing a median filtering on one of the third result to produce a fourth result; and
    performing a coherency filtering on the fourth result to produce a final processing of the sonic monopole waveform.

2. The method according to claim 1, wherein the beamform stack occurs for P waves of the sonic signal.

3. The method according to claim 1, wherein the beamform stack occurs for S waves of the sonic signal.

4. The method according to claim 1, wherein the adaptive interference canceler filter is applied to a common shot domain of the sonic signal of the monopole source.

5. The method according to claim 1, wherein the median filter is applied to a common-offset domain.

6. The method according to claim 1, wherein the sonic monopole waveform is received at 8 receivers in a downhole tool.

7. The method according to claim 6, wherein each of the 8 receivers is located at a different azimuth than other receivers.

8. A method for processing of a sonic dipole waveform, comprising:
  obtaining a beamform stack of the sonic dipole waveform to produce a first dipole result;
  performing a band-pass filtering on the first dipole result to produce a second dipole result;
  performing a median filtering on one of the second dipole result to produce a third dipole result;
  performing a deconvolution on the third result to produce a fourth dipole result; and
  performing a coherency filtering on the fourth result to produce a final processing of the sonic dipole waveform.

9. The method according to claim 8, wherein the beamform stack occurs for P waves of the sonic signal.

10. The method according to claim 8, wherein the beamform stack occurs for S waves of the sonic signal.

11. The method according to claim 8, wherein the median filter is applied to a common-offset domain.

12. The method according to claim 8, wherein the sonic monopole waveform is received at 8 receivers in a downhole tool.

13. The method according to claim 12, wherein each of the 8 receivers is located at a different azimuth than other receivers.

* * * * *